(12) United States Patent
Li et al.

(10) Patent No.: US 10,779,281 B2
(45) Date of Patent: Sep. 15, 2020

(54) DATA TRANSMISSION METHOD, BASE STATION, AND USER EQUIPMENT

(71) Applicant: HUAWEI TECHNOLOGIES CO., LTD., Shenzhen (CN)

(72) Inventors: Zhongfeng Li, Munich (DE); Ning Wu, Shanghai (CN); Youtuan Zhu, Shanghai (CN); Yongzhao Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/996,481

(22) Filed: Jun. 3, 2018

(65) Prior Publication Data
US 2018/0302904 A1 Oct. 18, 2018

Related U.S. Application Data

(63) Continuation of application No. PCT/CN2016/108375, filed on Dec. 2, 2016.

(30) Foreign Application Priority Data

Dec. 3, 2015 (CN) .......................... 2015 1 0882081

(51) Int. Cl.
*H04L 12/28* (2006.01)
*H04W 72/04* (2009.01)
(Continued)

(52) U.S. Cl.
CPC ....... *H04W 72/0466* (2013.01); *H04L 5/0044* (2013.01); *H04L 27/34* (2013.01); *H04W 72/005* (2013.01)

(58) Field of Classification Search
CPC ........... H04W 72/005; H04W 72/0466; H04W 16/28
(Continued)

(56) References Cited

U.S. PATENT DOCUMENTS 6,330,459 B1    12/2001  Crichton et al.
6,542,484 B1 *   4/2003  Ovesjo .................. H04J 13/004
                                                         370/335

(Continued)

FOREIGN PATENT DOCUMENTS

CN    101502022 A    8/2009
CN    101536442 A    9/2009
(Continued)

*Primary Examiner* — John Pezzlo
(74) *Attorney, Agent, or Firm* — Kilpatrick Townsend & Stockton LLP

(57) ABSTRACT

A data transmission method is provided to expand coverage of a broadcast channel, including: determining, by a base station, a plurality of data blocks carried on N broadcast channels, where an $i^{th}$ broadcast channel in the N broadcast channels corresponds to an $i^{th}$ antenna port (group) in N antenna ports (group); scrambling, by the base station, the data blocks carried on the N broadcast channels, to obtain scrambled code blocks carried on the N broadcast channels; and sending, by the base station on different time resource units by respectively using the N antenna ports, corresponding scrambled code blocks carried on the broadcast channels, or sending, by the base station on different time resource units by respectively using the N antenna port groups, corresponding scrambled code blocks carried on the broadcast channels.

18 Claims, 7 Drawing Sheets

A base station determines a plurality of data blocks carried on N broadcast channels, where an $i^{th}$ broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups — 201

The base station scrambles the data blocks carried on the N broadcast channels, to obtain scrambled code blocks carried on the N broadcast channels — 202

The base station sends, on different time resource units by respectively using the N antenna ports, corresponding scrambled code blocks carried on the broadcast channels, or the base station sends, on different time resource units by respectively using the N antenna port groups, corresponding scrambled code blocks carried on the broadcast channels — 203

(51) Int. Cl.
*H04L 27/34* (2006.01)
*H04L 5/00* (2006.01)
*H04W 72/00* (2009.01)
*H04J 1/16* (2006.01)

(58) Field of Classification Search
USPC .............................. 370/252, 329, 430, 442
See application file for complete search history.

(56) References Cited

U.S. PATENT DOCUMENTS

| | | | | |
|---|---|---|---|---|
| 2008/0181291 | A1* | 7/2008 | Zhou | H04B 7/1858 375/227 |
| 2009/0185635 | A1 | 7/2009 | Okello | |
| 2009/0252109 | A1* | 10/2009 | Kim | H04B 7/0689 370/330 |
| 2010/0074350 | A1 | 3/2010 | Malladi et al. | |
| 2012/0201229 | A1* | 8/2012 | Feng | H04W 72/0413 370/336 |
| 2012/0307726 | A1 | 12/2012 | Pi et al. | |
| 2013/0064239 | A1 | 3/2013 | Yu et al. | |
| 2013/0121185 | A1* | 5/2013 | Li | H04W 24/10 370/252 |
| 2014/0112220 | A1 | 4/2014 | Kwak et al. | |
| 2014/0128109 | A1* | 5/2014 | Li | H04W 68/02 455/458 |
| 2014/0177607 | A1* | 6/2014 | Li | H04W 52/42 370/336 |
| 2014/0219238 | A1 | 8/2014 | Park et al. | |
| 2015/0257132 | A1* | 9/2015 | Park | H04W 72/042 370/329 |
| 2016/0105257 | A1 | 4/2016 | Jiao et al. | |
| 2016/0353420 | A1* | 12/2016 | You | H04L 5/0053 |
| 2018/0063828 | A1 | 3/2018 | Wang et al. | |

FOREIGN PATENT DOCUMENTS

| | | |
|---|---|---|
| CN | 101997651 A | 3/2011 |
| CN | 103843260 A | 6/2014 |
| CN | 104104466 A | 10/2014 |
| JP | 2001501061 A | 1/2001 |
| JP | 2002516550 A | 6/2002 |
| JP | 2014520433 A | 8/2014 |
| JP | 2014532320 A | 12/2014 |
| WO | 2014201947 A1 | 12/2014 |
| WO | 2015080646 A1 | 6/2015 |
| WO | 2015172364 A1 | 11/2015 |
| WO | 2016154809 A1 | 10/2016 |

* cited by examiner

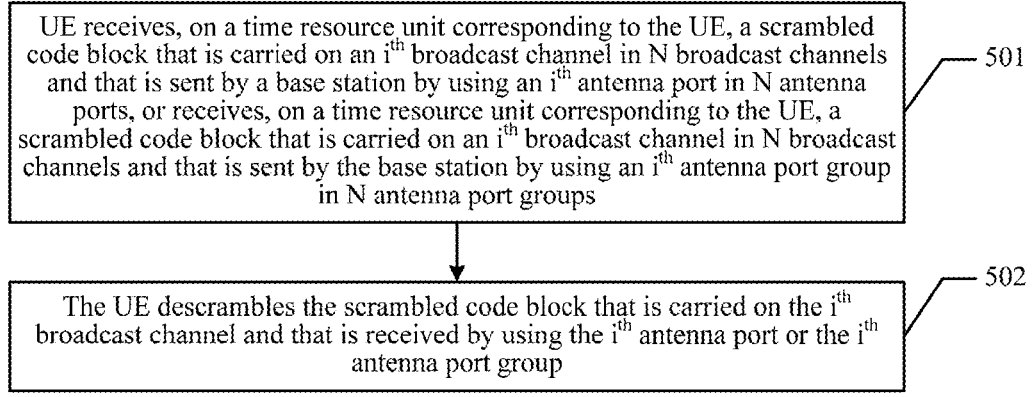
FIG. 5
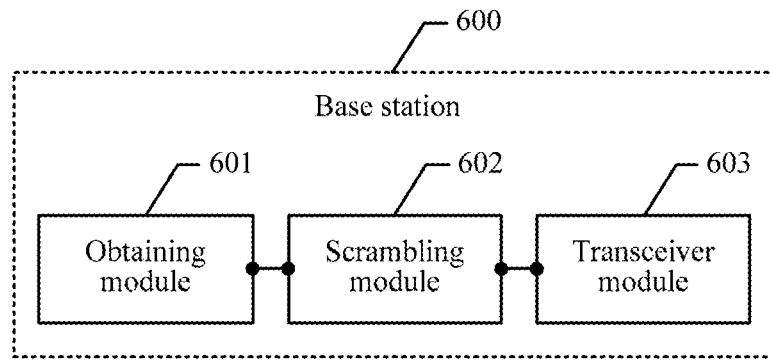
FIG. 6-a
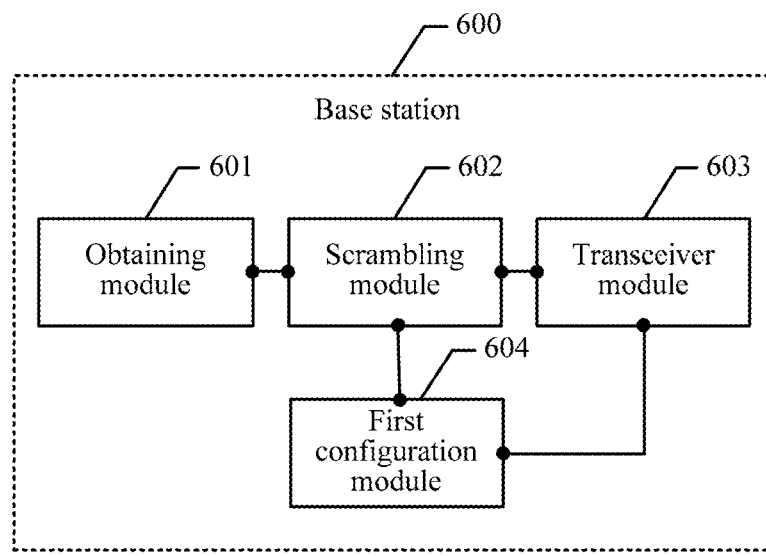
FIG. 6-b

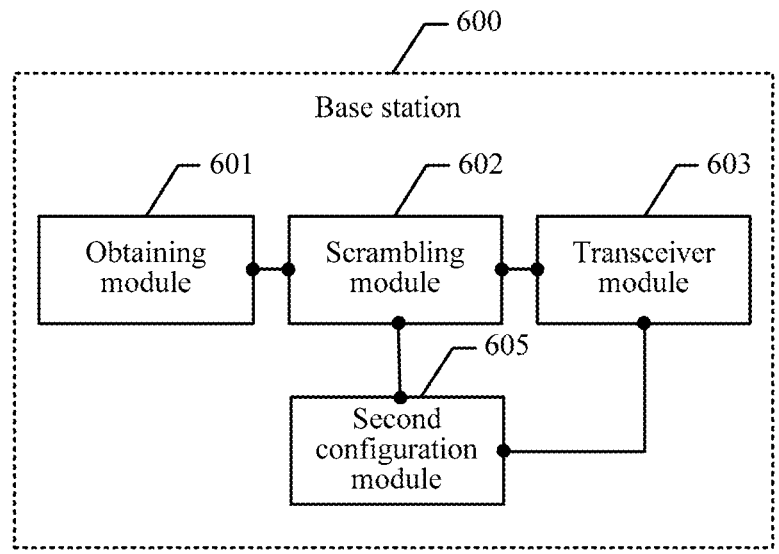
FIG. 6-c
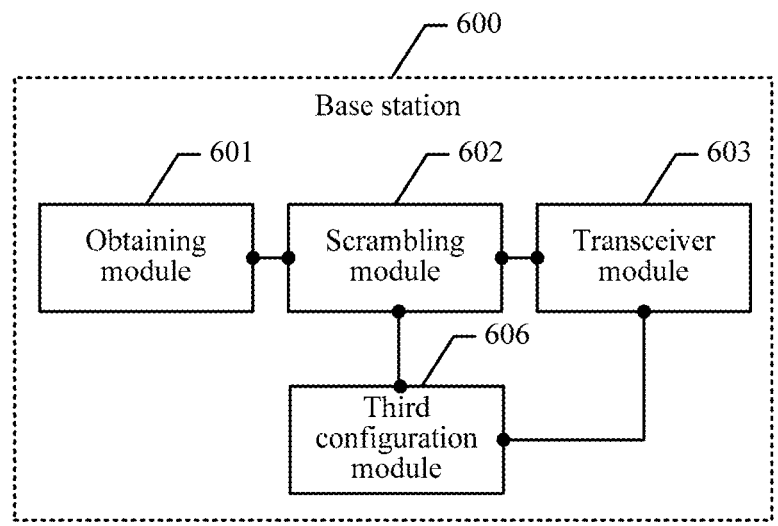
FIG. 6-d
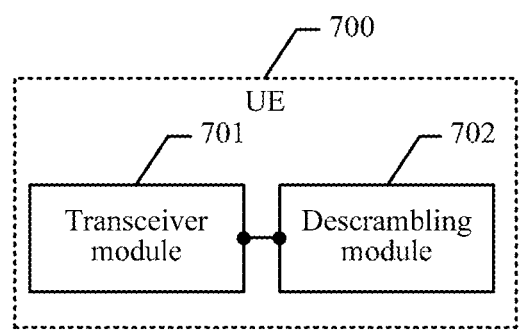
FIG. 7-a

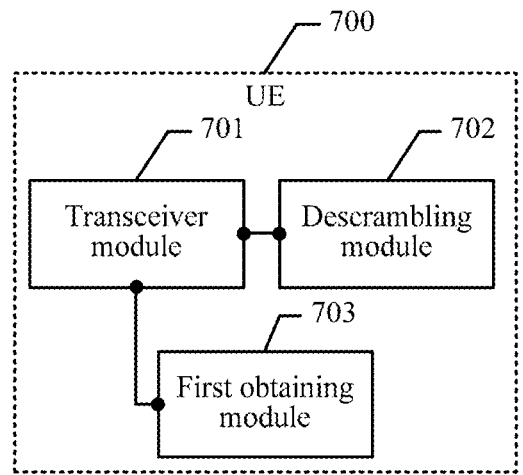
FIG. 7-b
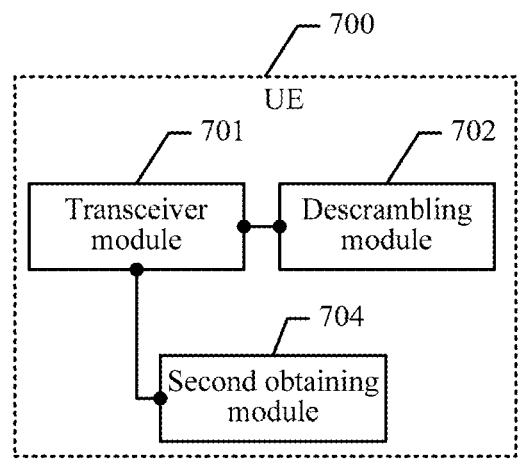
FIG. 7-c
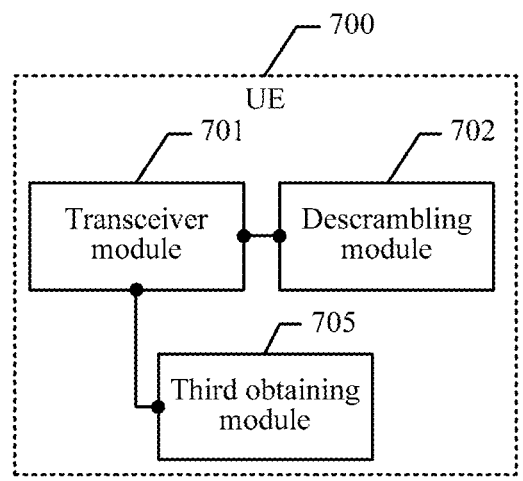
FIG. 7-d

DATA TRANSMISSION METHOD, BASE STATION, AND USER EQUIPMENT

CROSS-REFERENCE TO RELATED APPLICATIONS

This application is a continuation of International Application No. PCT/CN2016/108375, filed on Dec. 2, 2016, which claims priority to Chinese Patent Application No. 201510882081.7, filed on Dec. 3, 2015, The disclosures of the aforementioned applications are hereby incorporated by reference in their entireties.

TECHNICAL FIELD

The present invention relates to the field of computer technologies, and in particular, to a data transmission method, a base station, and user equipment.

BACKGROUND

In a current cellular system, generally, system information is transmitted by using a broadcast channel. The system information includes user access information, and configuration information and operation information on another channel in a cell. Therefore, correct reception of information on a broadcast channel is crucial for system operation. For example, in a Long Term Evolution (LTE) system, system information transmitted by using a broadcast channel is classified into two types: a master information block (MIB) message and a system information block (SIB) message. A parameter included in the MIB message may be used for an initial access process of user equipment (UE), and an evolved NodeB (eNodeB) broadcasts the MIB message to the UE by using a physical broadcast channel (PBCH).

A PBCH is sent by using a wide beam in a current LTE system. A wide beam means that the beam covers a very broad range, for example, the beam can cover an entire cell. A MIB message is carried on a PBCH. The MIB message is repeatedly sent four times in a period of 40 milliseconds (ms), and each sent PBCH carries same codeword information. To be specific, each piece of sent codeword information can be independently descrambled. Therefore, when a signal-to-interference ratio (SIR) is high enough, UE may successfully obtain through descrambling, by just receiving one MIB message that is sent within the 40 ms, codeword information carried on the PBCH. If the descrambling fails, the codeword information may be combined with content carried on a PBCH that is sent in next 10 ms, and then joint descrambling is performed, until the codeword information carried on the PBCH is successfully obtained through descrambling.

With evolution of mobile communications technologies, a massive multiple input multiple output (massive MIMO) technology may be used in future systems. The technology can greatly improve spectral efficiency, and a beamforming (English full name: beamforming) technology is mainly used for a current data channel. In this case, to keep consistent with coverage of a data channel, a PBCH as a common channel also needs to be sent by using a plurality of beams. However, in the prior art, a PBCH sending solution is inapplicable to a multibeam system, because in the prior art, PBCHs carrying same information and different scrambling codes need to be continuously received on a beam of a target UE, but according to a requirement of the massive multiple input multiple output technology, continuous transmission of the PBCHs on the beam of the target UE inevitably fails. Therefore, the prior art is inapplicable to the multibeam system.

SUMMARY

Embodiments of the present invention provide a data transmission method, a base station, and user equipment, to transmit broadcast channels on a plurality of antenna ports or antenna port groups, thereby expanding coverage of the broadcast channels.

To resolve the foregoing technical problems, the embodiments of the present invention provide the following technical solutions.

According to a first aspect, an embodiment of the present invention provides a data transmission method, including:

determining, by a base station, a plurality of data blocks carried on N broadcast channels, where an $i^{th}$ broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups, where N is a positive integer, and i is a positive integer greater than 0 and less than or equal to N;

scrambling, by the base station, the data blocks carried on the N broadcast channels, to obtain scrambled code blocks carried on the N broadcast channels; and sending, by the base station on different time resource units by respectively using the N antenna ports, corresponding scrambled code blocks carried on the broadcast channels, or sending, by the base station on different time resource units by respectively using the N antenna port groups, corresponding scrambled code blocks carried on the broadcast channels.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UE receive, by using antenna ports or antenna port groups corresponding to the UE, the scrambled code blocks that are sent by the base station on the time resource units. In this way, the broadcast channels are transmitted on a plurality of antenna ports or antenna port groups, thereby expanding coverage of the broadcast channels.

With reference to the first aspect, in a first possible implementation of the first aspect, the scrambling, by the base station, the data blocks carried on the N broadcast channels, to obtain scrambled code blocks carried on the N broadcast channels includes:

scrambling, by the base station by using a first scrambling code, a data block carried on each of the N broadcast channels, to obtain N first scrambled code blocks carried on the N broadcast channels; and/or scrambling, by the base station by using a second scrambling code, a data block carried on each of the N broadcast channels, to obtain N second scrambled code blocks carried on the N broadcast channels, where the first scrambling code and the second scrambling code are different scrambling codes.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

With reference to the first aspect, in a second possible implementation of the first aspect, the $i^{th}$ broadcast channel in the N broadcast channels carries indication information of an antenna port or an antenna port group of user equipment UE corresponding to the $i^{th}$ broadcast channel; or a pilot signal carried on the $i^{th}$ broadcast channel in the N broadcast channels corresponds to indication information of an antenna port or an antenna port group of UE corresponding to the $i^{th}$ broadcast channel; or a value of a synchronization sequence on an antenna port of UE corresponding to the $i^{th}$ broadcast channel in the N broadcast channels corresponds to indication information of the antenna port of the UE corresponding to the $i^{th}$ broadcast channel, or a value of a synchronization sequence on an antenna port group of UE corresponding to the $i^{th}$ broadcast channel in the N broadcast channels corresponds to indication information of the antenna port group of the UE corresponding to the $i^{th}$ broadcast channel; or a scrambling code that is used when a data block carried on the $i^{th}$ broadcast channel in the N broadcast channels is scrambled corresponds to indication information of an antenna port or an antenna port group of UE corresponding to the $i^{th}$ broadcast channel.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

With reference to the first aspect or the first or the second possible implementation of the first aspect, in a third possible implementation of the first aspect, after the scrambling, by the base station, the data blocks carried on the N broadcast channels, to obtain scrambled code blocks carried on the N broadcast channels, the method further includes:

indicating, by the base station by using system information on the $i^{th}$ broadcast channel in the N broadcast channels, first part information of a system frame number SFN of the UE corresponding to the $i^{th}$ broadcast channel; and/or indicating, by the base station, second part information of the SFN by using a quantity of scrambled code blocks sent to the UE corresponding to the $i^{th}$ broadcast channel; and/or indicating, by the base station, third part information of the SFN by using position information of the antenna port or the antenna port group of the UE corresponding to the $i^{th}$ broadcast channel, where the SFN consists of the first part information and the second part information, or the SFN consists of the first part information and the third part information, or the SFN consists of the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

With reference to the first possible implementation of the first aspect, in a fourth possible implementation of the first aspect, the sending, by the base station on different time resource units by respectively using the N antenna ports, corresponding scrambled code blocks carried on the broadcast channels includes:

respectively sending, by the base station, the N first scrambled code blocks on N time resource units in a first data transmission period by using the N antenna ports, where an $i^{th}$ first scrambled code block in the N first scrambled code blocks is sent on the $i^{th}$ antenna port in the N antenna ports; and/or respectively sending, by the base station, the N second scrambled code blocks on N time resource units in a second data transmission period by using the N antenna ports, where an $i^{th}$ second scrambled code block in the N second scrambled code blocks is sent on the $i^{th}$ antenna port in the N antenna ports, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

With reference to the first possible implementation of the first aspect, in a fifth possible implementation of the first aspect, the sending, by the base station on different time resource units by respectively using the N antenna port groups, corresponding scrambled code blocks carried on the broadcast channels includes:

respectively sending, by the base station, the N first scrambled code blocks on N time resource units in a first data transmission period by using the N antenna port groups, where an $i^{th}$ first scrambled code block in the N first scrambled code blocks is sent on the $i^{th}$ antenna port group in the N antenna port groups; and/or respectively sending, by the base station, the N second scrambled code blocks on N time resource units in a second data transmission period by using the N antenna port groups, where an $i^{th}$ second scrambled code block in the N second scrambled code blocks is sent on the $i^{th}$ antenna port group in the N antenna port groups, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

With reference to the first aspect, in a sixth possible implementation of the first aspect, the base station adds value information of N to the N broadcast channels; or the base station uses value information of N as masks of cyclical redundancy checks CRCs of the N broadcast channels.

Therefore, the base station indicates a quantity of broadcast channels to the UE by using the masks of the CRCs, and the UE can determine the quantity of broadcast channels by using the masks of the CRCs.

With reference to the third possible implementation of the first aspect, in a seventh possible implementation of the first aspect, a quantity of bit positions in the SFN that are occupied by the second part information is determined based on a value of N.

With reference to the third possible implementation of the first aspect, in an eighth possible implementation of the first aspect, a quantity of bit positions in the SFN that are occupied by the third part information is determined based on a quantity of scrambled code blocks sent to the UE corresponding to the $i^{th}$ broadcast channel.

According to a second aspect, an embodiment of the present invention further provides a data transmission method, including:

receiving, by user equipment UE on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, where N is a positive integer, i is a positive integer greater than 0 and less than or equal to N, and the UE corresponds to the $i^{th}$ antenna port or the $i^{th}$ antenna port group; and descrambling, by the UE, the scrambled code block that is carried on the $i^{th}$ broadcast channel and that is received by using the $i^{th}$ antenna port or the $i^{th}$ antenna port group.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UE receives, by using antenna ports or antenna port groups corresponding to the UE, the scrambled code blocks that are sent by the base station on the time resource units. In this way, the broadcast channels are transmitted on a plurality of antenna ports or antenna port groups, thereby expanding coverage of the broadcast channels.

With reference to the second aspect, in a first possible implementation of the second aspect, the descrambling, by the UE, the scrambled code block that is carried on the $i^{th}$ broadcast channel and that is received by using the $i^{th}$ antenna port or the $i^{th}$ antenna port group includes: descrambling, by the UE, the $i^{th}$ first scrambled code block carried on the $i^{th}$ broadcast channel; or descrambling, by the UE, the $i^{th}$ second scrambled code block carried on the $i^{th}$ broadcast channel; or combining, by the UE, the $i^{th}$ first scrambled code block and the $i^{th}$ second scrambled code block that are carried on the $i^{th}$ broadcast channel, and then, descrambling the $i^{th}$ first scrambled code block and the $i^{th}$ second scrambled code block that are combined.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

With reference to the second aspect, in a second possible implementation of the second aspect, before the receiving, by user equipment UE on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the method further includes:

obtaining, by the UE, position information of the antenna port or the antenna port group of the UE based on indication information carried on the $i^{th}$ broadcast channel; or obtaining, by the UE, position information of the antenna port or the antenna port group of the UE based on a pilot signal carried on the $i^{th}$ broadcast channel; or obtaining, by the UE, position information of the antenna port of the UE based on a value of a synchronization sequence on the antenna port of the UE, or obtaining, by the UE, position information of the antenna port group of the UE based on a value of a synchronization sequence on the antenna port group of the UE; or obtaining, by the UE, position information of the antenna port or the antenna port group of the UE based on a scrambling code that is used when the scrambled code block carried on the $i^{th}$ broadcast channel is descrambled.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

With reference to the second aspect or the first or the second possible implementation of the second aspect, in a third possible implementation of the second aspect, before the receiving, by user equipment UE on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the method further includes:

obtaining, by the UE, first part information of a system frame number SFN by using system information on the $i^{th}$ broadcast channel in the N broadcast channels; and/or obtaining, by the UE, second part information of the SFN by using a quantity of scrambled code blocks received by the UE; and/or obtaining, by the UE, third part information of the SFN by using the position information of the antenna port or the antenna port group of the UE; and obtaining, by the UE, the SFN by using the first part information and the second part information, or obtaining, by the UE, the SFN by using the first part information and the third part information, or obtaining, by the UE, the SFN by using the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

With reference to the second aspect, in a fourth possible implementation of the second aspect, the receiving, by user equipment UE on a time resource unit corresponding to the UE, a scrambled code block that is carried on an $i^{th}$ broadcast channel in N broadcast channels and that is sent by a base station by using an $i^{th}$ antenna port in N antenna ports includes:

receiving, by the UE on an $i^{th}$ time resource unit in a first data transmission period, an $i^{th}$ first scrambled code block that is carried on the $i^{th}$ broadcast channel and that is sent by the base station by using the $i^{th}$ antenna port in the N antenna ports; and/or receiving, by the UE on an $i^{th}$ time resource unit in a second data transmission period, an $i^{th}$ second scrambled code block that is carried on the $i^{th}$ broadcast channel and that is sent by the base station by using the $i^{th}$ antenna port in the N antenna ports, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

With reference to the second aspect, in a fifth possible implementation of the second aspect, the receiving, by user equipment UE on a time resource unit corresponding to the UE, a scrambled code block that is carried on an $i^{th}$ broadcast channel in N broadcast channels and that is sent by a base station by using an $i^{th}$ antenna port group in N antenna port groups includes:

receiving, by the UE on an $i^{th}$ time resource unit in a first data transmission period, an $i^{th}$ first scrambled code block that is carried on the $i^{th}$ broadcast channel and that is sent by the base station by using the $i^{th}$ antenna port group in the N antenna port groups; and/or receiving, by the UE on an $i^{th}$ time resource unit in a second data transmission period, an $i^{th}$ second scrambled code block that is carried on the $i^{th}$ broadcast channel and that is sent by the base station by using the $i^{th}$ antenna port group in the N antenna port groups, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

With reference to the second aspect, in a sixth possible implementation of the second aspect, before the receiving, by user equipment UE on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the method further includes:

obtaining, by the UE, a value of N from value information carried on the $i^{th}$ broadcast channel; or obtaining, by the UE, a value of N based on a mask of a cyclical redundancy check CRC of the $i^{th}$ broadcast channel.

Therefore, the base station indicates a quantity of broadcast channels to the UE by using the masks of the CRCs, and the UE can determine the quantity of broadcast channels by using the masks of the CRCs.

With reference to the third possible implementation of the second aspect, in a seventh possible implementation of the second aspect, a quantity of bit positions in the SFN that are occupied by the second part information is determined based on a value of N.

With reference to the third possible implementation of the second aspect, in an eighth possible implementation of the second aspect, a quantity of bit positions in the SFN that are occupied by the third part information is determined based on a quantity of scrambled code blocks sent to the UE corresponding to the $i^{th}$ broadcast channel.

According to a third aspect, an embodiment of the present invention further provides a base station, including:

an obtaining module, configured to determine a plurality of data blocks carried on N broadcast channels, where an $i^{th}$ broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups, where N is a positive integer, and i is a positive integer greater than 0 and less than or equal to N;

a scrambling module, configured to scramble the data blocks carried on the N broadcast channels, to obtain scrambled code blocks carried on the N broadcast channels; and a transceiver module, configured to: send, on different time resource units by respectively using the N antenna ports, corresponding scrambled code blocks carried on the broadcast channels, or send, on different time resource units by respectively using the N antenna port groups, corresponding scrambled code blocks carried on the broadcast channels.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

With reference to the third aspect, in a first possible implementation of the third aspect, the scrambling module is specifically configured to: scramble, by using a first scrambling code, a data block carried on each of the N broadcast channels, to obtain N first scrambled code blocks carried on the N broadcast channels; and/or scramble, by using a second scrambling code, a data block carried on each of the N broadcast channels, to obtain N second scrambled code blocks carried on the N broadcast channels, where the first scrambling code and the second scrambling code are different scrambling codes.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

With reference to the third aspect, in a second possible implementation of the third aspect, the base station further includes a first configuration module, configured to configure the following information: the $i^{th}$ broadcast channel in the N broadcast channels carries indication information of an antenna port or an antenna port group of user equipment UE corresponding to the $i^{th}$ broadcast channel; or a pilot signal carried on the $i^{th}$ broadcast channel in the N broadcast channels corresponds to indication information of an antenna port or an antenna port group of UE corresponding to the $i^{th}$ broadcast channel; or a value of a synchronization sequence on an antenna port of UE corresponding to the $i^{th}$ broadcast channel in the N broadcast channels corresponds to indication information of the antenna port of the UE corresponding to the $i^{th}$ broadcast channel, or a value of a synchronization sequence on an antenna port group of UE corresponding to the $i^{th}$ broadcast channel in the N broadcast channels corresponds to indication information of the antenna port group of the UE corresponding to the $i^{th}$ broadcast channel; or a scrambling code that is used when a data block carried on the $i^{th}$ broadcast channel in the N broadcast channels is scrambled corresponds to indication information of an antenna port or an antenna port group of UE corresponding to the $i^{th}$ broadcast channel.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

With reference to the third aspect or the first or the second possible implementation of the third aspect, in a third possible implementation of the third aspect, the base station further includes a second configuration module, configured to: after the scrambling module scrambles the data blocks carried on the N broadcast channels, to obtain the scrambled code blocks carried on the N broadcast channels, configure the following information: first part information of a system frame number SFN of the UE corresponding to the $i^{th}$ broadcast channel is indicated by using system information on the $i^{th}$ broadcast channel in the N broadcast channels; and/or second part information of the SFN is indicated by using a quantity of scrambled code blocks sent to the UE corresponding to the $i^{th}$ broadcast channel; and/or third part information of the SFN is indicated by using position information of the antenna port or the antenna port group of the UE corresponding to the $i^{th}$ broadcast channel, where the SFN consists of the first part information and the second part information, or the SFN consists of the first part information and the third part information, or the SFN consists of the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

With reference to the first possible implementation of the third aspect, in a fourth possible implementation of the third aspect, the transceiver module is specifically configured to: respectively send the N first scrambled code blocks on N time resource units in a first data transmission period by using the N antenna ports, where an $i^{th}$ first scrambled code block in the N first scrambled code blocks is sent on the $i^{th}$ antenna port in the N antenna ports; and/or respectively send the N second scrambled code blocks on N time resource units in a second data transmission period by using the N antenna ports, where an $i^{th}$ second scrambled code block in the N second scrambled code blocks is sent on the $i^{th}$ antenna port in the N antenna ports, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

With reference to the first possible implementation of the third aspect, in a fifth possible implementation of the third aspect, the transceiver module is specifically configured to: respectively send the N first scrambled code blocks on N time resource units in a first data transmission period by using the N antenna port groups, where an $i^{th}$ first scrambled code block in the N first scrambled code blocks is sent on the $i^{th}$ antenna port group in the N antenna port groups; and/or respectively send the N second scrambled code blocks on N time resource units in a second data transmission period by using the N antenna port groups, where an $i^{th}$ second scrambled code block in the N second scrambled code blocks is sent on the $i^{th}$ antenna port group in the N antenna port groups, and the second data transmission period is a data transmission period adjacent to the first data transmission period in time.

With reference to the third aspect, in a sixth possible implementation of the third aspect, the base station further includes a third configuration module, configured to: add value information of N to the N broadcast channels; or use value information of N as masks of cyclical redundancy checks CRCs of the N broadcast channels.

Therefore, the base station indicates a quantity of broadcast channels to the UE by using the masks of the CRCs, and the UE can determine the quantity of broadcast channels by using the masks of the CRCs.

With reference to the third possible implementation of the third aspect, in a seventh possible implementation of the third aspect, a quantity of bit positions in the SFN that are occupied by the second part information is determined based on a value of N.

With reference to the third possible implementation of the third aspect, in an eighth possible implementation of the third aspect, a quantity of bit positions in the SFN that are occupied by the third part information is determined based on a quantity of scrambled code blocks sent to the UE corresponding to the $i^{th}$ broadcast channel.

According to a fourth aspect, an embodiment of the present invention further provides user equipment UE, including:

a transceiver module, configured to: receive, on a time resource unit corresponding to the UE, a scrambled code block that is carried on an $i^{th}$ broadcast channel in N broadcast channels and that is sent by a base station by using an $i^{th}$ antenna port in N antenna ports, or receive, on a time resource unit corresponding to the UE, a scrambled code block that is carried on an $i^{th}$ broadcast channel in N broadcast channels and that is sent by the base station by using an $i^{th}$ antenna port group in N antenna port groups, where N is a positive integer, i is a positive integer greater than 0 and less than or equal to N, and the UE corresponds to the $i^{th}$ antenna port or the $i^{th}$ antenna port group; and a descrambling module, configured to descramble the scrambled code block that is carried on the $i^{th}$ broadcast channel and that is received by using the $i^{th}$ antenna port or the $i^{th}$ antenna port group.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

With reference to the fourth aspect, in a first possible implementation of the fourth aspect, the descrambling module is specifically configured to: descramble the $i^{th}$ first scrambled code block carried on the $i^{th}$ broadcast channel; or descramble the $i^{th}$ second scrambled code block carried on the $i^{th}$ broadcast channel; or combine the $i^{th}$ first scrambled code block and the $i^{th}$ second scrambled code block that are carried on the $i^{th}$ broadcast channel, and then, descramble the $i^{th}$ first scrambled code block and the $i^{th}$ second scrambled code block that are combined.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

With reference to the fourth aspect, in a second possible implementation of the fourth aspect, the user equipment further includes a first obtaining module, configured to: after the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain position information of the antenna port or the antenna port group of the UE based on indication information carried on the $i^{th}$ broadcast channel; or obtain position information of the antenna port or the antenna port group of the UE based on a pilot signal carried on the $i^{th}$ broadcast channel; or obtain position information of the antenna port of the UE based on a value of a synchronization sequence on the antenna port of the UE, or obtain position information of the antenna port group of the UE based on a value of a synchronization sequence on the antenna port group of the UE; or obtain position information of the antenna port or the antenna port group of the UE based on a scrambling code that is used when the scrambled code block carried on the $i^{th}$ broadcast channel is descrambled.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

With reference to the fourth aspect or the first or the second possible implementation of the fourth aspect, in a third possible implementation of the fourth aspect, the user equipment further includes a second obtaining module, configured to: before the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain first part information of a system frame number SFN by using system information on the $i^{th}$ broadcast channel in the N broadcast channels; and/or obtain second part information of the SFN by using a quantity of scrambled code blocks received by the UE; and/or obtain third part information of the SFN by using the position information of the antenna port or the antenna port group of the UE; and obtain the SFN by using the first part information and the second part information, or obtain the SFN by using the first part information and the third part information, or obtain the SFN by using the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

With reference to the fourth aspect, in a fourth possible implementation of the fourth aspect, the transceiver module is specifically configured to: receive, on an $i^{th}$ time resource unit in a first data transmission period, an $i^{th}$ first scrambled code block that is carried on the $i^{th}$ broadcast channel and that is sent by the base station by using the $i^{th}$ antenna port in the N antenna ports; and/or receive, on an $i^{th}$ time resource unit in a second data transmission period, an $i^{th}$ second scrambled code block that is carried on the $i^{th}$ broadcast channel and that is sent by the base station by using the $i^{th}$ antenna port in the N antenna ports, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

With reference to the fourth aspect, in a fifth possible implementation of the fourth aspect, the transceiver module is specifically configured to: receive, on an $i^{th}$ time resource unit in a first data transmission period, an $i^{th}$ first scrambled code block that is carried on the $i^{th}$ broadcast channel and that is sent by the base station by using the $i^{th}$ antenna port group in the N antenna port groups; and/or receive, on an $i^{th}$ time resource unit in a second data transmission period, an $i^{th}$ second scrambled code block that is carried on the $i^{th}$ broadcast channel and that is sent by the base station by using the $i^{th}$ antenna port group in the N antenna port groups, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

With reference to the fourth aspect, in a sixth possible implementation of the fourth aspect, the user equipment further includes a third obtaining module, configured to: before the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain a value of N from value information carried on the $i^{th}$ broadcast channel; or obtain a value of N based on a mask of a cyclical redundancy check CRC of the $i^{th}$ broadcast channel.

Therefore, the base station indicates a quantity of broadcast channels to the UE by using the masks of the CRCs, and the UE can determine the quantity of broadcast channels by using the masks of the CRCs.

With reference to the third possible implementation of the fourth aspect, in a seventh possible implementation of the fourth aspect, a quantity of bit positions in the SFN that are occupied by the second part information is determined based on a value of N.

With reference to the third possible implementation of the fourth aspect, in an eighth possible implementation of the fourth aspect, a quantity of bit positions in the SFN that are occupied by the third part information is determined based on a quantity of scrambled code blocks sent to the UE corresponding to the $i^{th}$ broadcast channel.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons skilled in the art may still derive other drawings from these accompanying drawings.

FIG. 5 is a schematic block flowchart of another data transmission method according to an embodiment of the present invention;

FIG. 6-a is a schematic diagram of a composition structure of a base station according to an embodiment of the present invention;

FIG. 6-b is a schematic diagram of a composition structure of another base station according to an embodiment of the present invention;

FIG. 6-c is a schematic diagram of a composition structure of another base station according to an embodiment of the present invention;

FIG. 6-d is a schematic diagram of a composition structure of another base station according to an embodiment of the present invention;

FIG. 7-a is a schematic diagram of a composition structure of UE according to an embodiment of the present invention;

FIG. 7-b is a schematic diagram of a composition structure of another UE according to an embodiment of the present invention;

FIG. 7-c is a schematic diagram of a composition structure of another UE according to an embodiment of the present invention;

FIG. 7-d is a schematic diagram of a composition structure of another UE according to an embodiment of the present invention;

DESCRIPTION OF EMBODIMENTS

Embodiments of the present invention provide a data transmission method, a base station, and user equipment, to transmit broadcast channels on a plurality of antenna ports or antenna port groups, thereby expanding coverage of the broadcast channels.

To make the invention objectives, features, and advantages of the present invention clearer and more comprehensible, the following describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the specification, claims, and the foregoing drawings of the present invention, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

A system architecture to which a data transmission method in the present invention is applied is briefly described first. The present invention is mainly applied to an LTE system or a Long Term Evolution-Advanced (LTE-A) system. The present invention is also applicable to another communications system, for example, a 5th Generation mobile communications technology (5G) system, a Wideband Code Division Multiple Access (WCDMA) system, or a Time Division-Synchronous Code Division Multiple Access (TD-SCDMA) system, as long as an entity that can send a broadcast message exists in the communications system, and another entity that can receive a broadcast message exists in the communications system.

Figure 1:
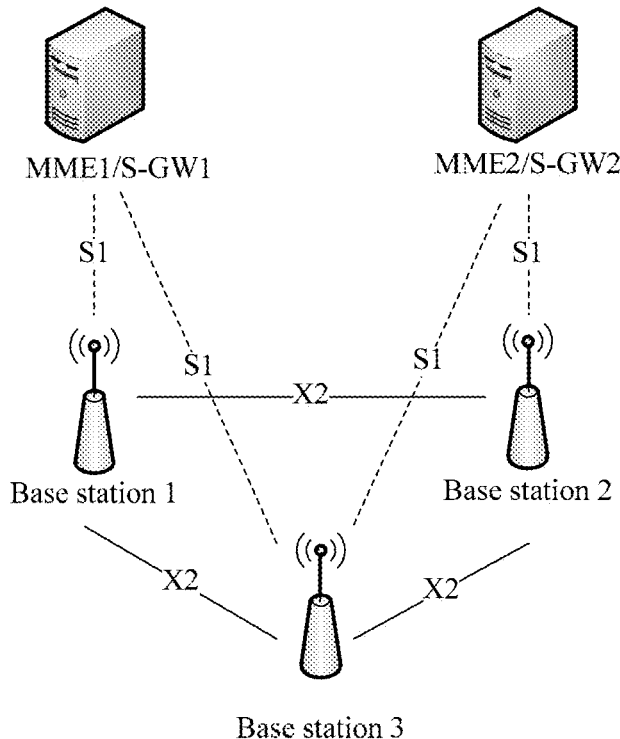
FIG. 1 is a schematic diagram of a system architecture to which a data transmission method according to an embodiment of the present invention is applied.

Referring to FIG. 1, FIG. 1 is a schematic diagram of a system architecture to which a data transmission method according to an embodiment of the present invention is applied. A base station to which UE 1 belongs is a base station 1, a base station to which UE 2 belongs is a base station 2, and a base station to which UE 3 belongs is a base station 3. The base station 1 is connected to the base station 2 by using an X2 interface, the base station 1 is connected to the base station 3 by using an X2 interface, and the base station 2 is connected to the base station 3 by using an X2 interface. The base station 1 is connected to a mobility management entity (MME) 1/a serving gateway (S-GW) 1 by using an S1 interface, the base station 2 is connected to an MME 2/an S-GW 2 by using an S1 interface, the base station 3 is connected to the MME 1/the S-GW 1 by using an S1 interface, and the base station 3 is connected to the MME 2/the S-GW 2 by using an S1 interface. The UE 1, the UE 2, and the UE 3 are in cells of different base stations.

Figure 2:
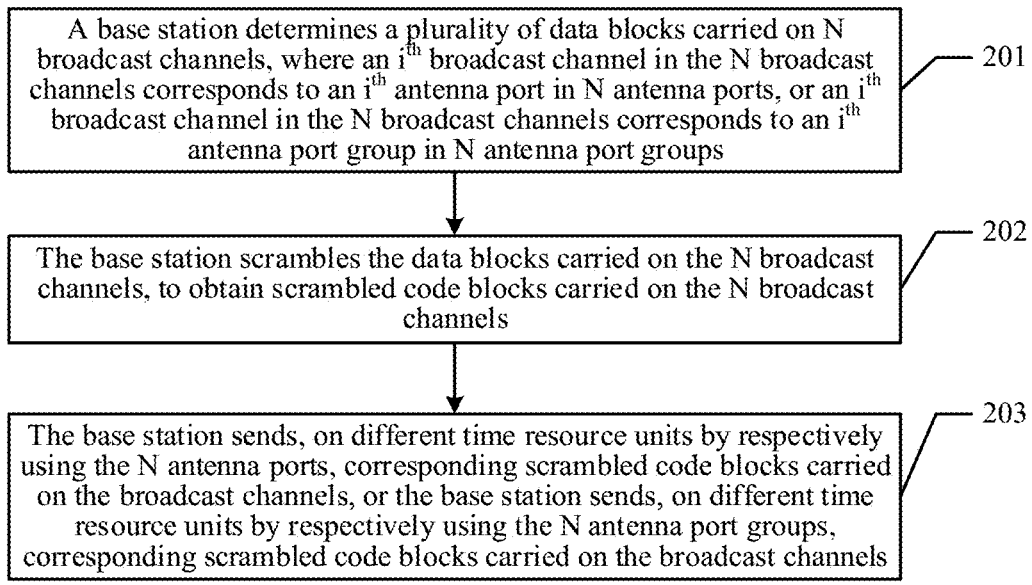
FIG. 2 is a schematic block flowchart of a data transmission method according to an embodiment of the present invention.

Next, a data transmission method implemented by a base station is used as an example for description. An embodiment of the data transmission method in the present invention is applicable to a base station side. In the present invention, a PBCH can be sent in a beam scanning scenario. Referring to FIG. 2, the data transmission method provided in this embodiment of the present invention may include the following steps.

201: The base station determines a plurality of data blocks carried on N broadcast channels, where an $i^{th}$ broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups.

N is a positive integer, and i is a positive integer greater than 0 and less than or equal to N.

In this embodiment of the present invention, the base station may transmit data by using an antenna port or an antenna port group. Specifically, the base station may determine that each of the N antenna ports corresponds to one broadcast channel (PBCH), or the base station may determine that each of the N antenna port groups corresponds to one broadcast channel. The base station determines that different antenna ports correspond to different broadcast channels, or the base station determines that different antenna port groups correspond to different broadcast channels. Different broadcast channels may be identified by using different channel identifiers, or broadcast channels may be distinguished by using identifiers that can be used to distinguish between different broadcast channels. It should be noted that, in this embodiment of the present invention, the N antenna ports determined by the base station need to cover a cell or all sectors included in the cell, or the N antenna port groups determined by the base station need to cover a cell or all sectors included in the cell. Therefore, in this embodiment of the present invention, a cell of the base station may be covered by the N antenna ports or the N antenna port groups.

In this embodiment of the present invention, the base station may transmit, by using one antenna port, data to one UE, or the base station may transmit, by using one antenna port group, data one UE. An antenna port is a logical port used for transmission, and has no defined one-to-one correspondence to a physical antenna. An antenna port is defined by a reference signal used for the antenna port. To be specific, the used reference signal is a name of a particular type of logical port. An antenna port group includes a plurality of antenna ports, and one antenna port group may be used to transmit data to one UE.

Figure 3:
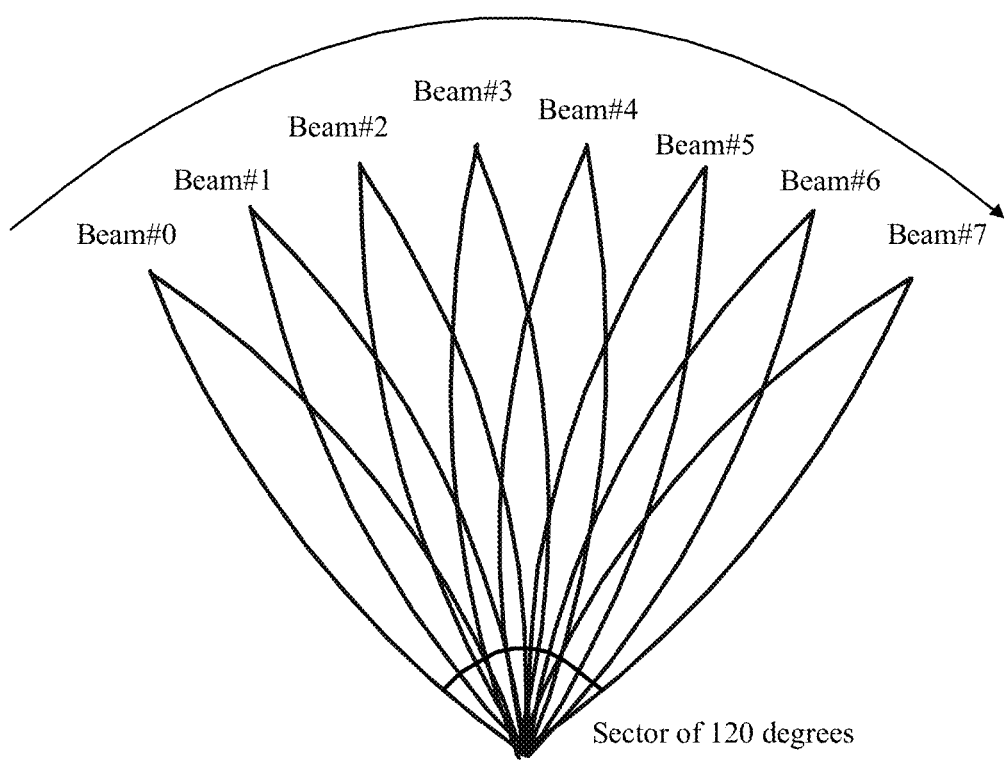
FIG. 3 is a schematic diagram of beam coverage according to an embodiment of the present invention.

It should be noted that, in this embodiment of the present invention, if one antenna port corresponds to one broadcast channel, the antenna port may also be referred to as a beam (English name: beam). In this embodiment of the present invention, if one antenna port group corresponds to one broadcast channel, the antenna port group may also be referred to as a beam. Each broadcast channel corresponds to one beam. If there are the N broadcast channels, the $i^{th}$ broadcast channel in the N broadcast channels corresponds to an $i^{th}$ beam in N beams. An example is used for description. Using transmission on a broadcast channel in a time division scanning manner in a multibeam system as an example, as shown in FIG. 3, FIG. 3 is a schematic diagram of beam coverage according to an embodiment of the present invention. An entire cell includes eight sectors, a coverage angle of the eight sectors is 120 degrees, and there are eight broadcast channels in total. The eight broadcast channels use eight beams in total for time division scanning. The base station first obtains broadcast channels respectively corresponding to the eight beams in the entire cell, and the eight beams cover exactly the cell or all the sectors included in the entire cell.

It should be noted that, in this embodiment of the present invention, the base station first obtains the plurality of data blocks carried on the N broadcast channels, and one data block or a plurality of data blocks are carried on each broadcast channel. For example, k (k is a natural number greater than or equal to 1) data blocks are carried on each broadcast channel. Therefore, the base station can obtain k×N data blocks carried on the N broadcast channels.

In some embodiments of the present invention, to enable a receive end (that is, UE) to obtain a value of N, the base station adds value information of N to the N broadcast channels; or the base station uses value information of N as masks of cyclical redundancy checks (CRC) of the N broadcast channels. To be specific, the base station may add information about a quantity of antenna ports (or antenna port groups) to the N broadcast channels, so that the UE may obtain, from a broadcast channel corresponding to the UE, the information about the quantity of antenna ports (or antenna port groups) that is carried on the broadcast channel, and the UE may determine a specific value of N. In addition, in this embodiment of the present invention, the base station may use an indirect manner instead of using a direct manner (for example, the value information of N is carried by using the N broadcast channels). For example, the base station uses the value information of N as the masks of the CRCs of the N broadcast channels, and the UE may determine, by using a mask used by a CRC of the broadcast channel corresponding to the UE, the value of N used by the base station.

An example is used for description. A manner of obtaining, by the UE, the value of N used on the base station side, that is, a manner of determining a quantity of beams by the base station, is provided. The base station may directly add indication information of the quantity of beams to an information element, for example, but not limited to, adding a beam quantity information element to the broadcast channel. It is assumed that a value of the quantity of beams is 4/8/16. For example, according to an implementation shown in the following Table 1, the base station adds a BeamNum information element to a MIB message on the broadcast channel, where the information element is used to carry information about the quantity of beams, and the UE may obtain the quantity of beams from the BeamNum information element in the MIB message.

| MIB parameter | Value |
| --- | --- |
| BeamNum | 4/8/16 |

It should be noted that, in some other embodiments of the present invention, the base station may add information about a quantity of beams in an indirect manner, for example, but not limited to that, a quantity of beams in a cell is 4/8/16, and the base station needs to notify the UE of a quantity of actually used beams. The base station may scramble a CRC of a PBCH based on the quantity of beams, and the UE may obtain the quantity of beams in the cell through descrambling. For example, correspondences between different quantities of beams and masks of CRCs are shown in the following Table 2.

| Quantity of beams | Mask |
| --- | --- |
| 4 | <0, 0, 0, 0, 0, 0, 0, 0, 0, 0, 0, 0, 0, 0, 0, 0> |
| 8 | <1, 1, 1, 1, 1, 1, 1, 1, 1, 1, 1, 1, 1, 1, 1, 1> |
| 16 | <0, 1, 0, 1, 0, 1, 0, 1, 0, 1, 0, 1, 0, 1, 0, 1> |

It may be learned from the foregoing example that, in this embodiment of the present invention, the base station may directly or indirectly notify the UE of a quantity of beams currently used on a network side.

In some embodiments of the present invention, the base station may notify the UE of a position of an antenna port or an antenna port group of the UE. The base station may notify the UE of the position of the antenna port or the antenna port group of the UE in a plurality of manners. For example, the base station may indicate, in at least one of the following manners, a position of an antenna port or an antenna port group of UE corresponding to the $i^{th}$ broadcast channel:

A1: The $i^{th}$ broadcast channel in the N broadcast channels carries indication information of the antenna port or the antenna port group of the UE corresponding to the $i^{th}$ broadcast channel; or A2: a pilot signal carried on the $i^{th}$ broadcast channel in the N broadcast channels corresponds to indication information of the antenna port or the antenna port group of the UE corresponding to the $i^{th}$ broadcast channel; or A3: a value of a synchronization sequence on the antenna port of the UE corresponding to the $i^{th}$ broadcast channel in the N broadcast channels corresponds to indication information of the antenna port of the UE corresponding to the $i^{th}$ broadcast channel, or a value of a synchronization sequence on the antenna port group of the UE corresponding to the $i^{th}$ broadcast channel in the N broadcast channels corresponds to indication information of the antenna port group of the UE corresponding to the $i^{th}$ broadcast channel; or A4: a scrambling code that is used when a data block carried on the $i^{th}$ broadcast channel in the N broadcast channels is scrambled corresponds to indication information of the antenna port or the antenna port group of the UE corresponding to the $i^{th}$ broadcast channel.

In an implementation shown in A1, the base station directly adds, to the $i^{th}$ broadcast channel, the indication information of the antenna port or the antenna port group of the UE corresponding to the $i^{th}$ broadcast channel, and the UE corresponding to the $i^{th}$ broadcast channel obtains, by receiving the indication information carried on the $i^{th}$ broadcast channel, the position of the antenna port or the antenna port group of the UE. An example is used for description below. The base station may directly notify information about a beam of the UE by using an information element, for example, but not limited to, directly adding beam identifier (ID) information to a PBCH information element sent on the beam of the UE, so that the UE can obtain, by demodulating a PBCH, information about a current beam of the UE. For example, in an implementation shown in the following Table 3, the base station adds a BeamId information element to the MIB message on the broadcast channel, where the information element is used to carry position information of the beam of the UE, and the UE may obtain a position of the beam of the UE from the BeamId information element in the MIB message.

| MIB parameter | Value |
|---|---|
| BeamId | [0, 7] |

In an implementation shown in A2 in the present invention, the pilot signal carried on the $i^{th}$ broadcast channel in the N broadcast channels corresponds to the indication information of the antenna port or the antenna port group of the UE corresponding to the $i^{th}$ broadcast channel. To be specific, the base station uses different pilot signals for different UEs, and there is a correspondence between a pilot signal and an antenna port or an antenna port group of UE. For example, the base station sets different pilot signals for different broadcast channels. In this way, the UE can learn of information about a current beam of the UE by demodulating a pilot signal. The base station respectively sends different pilot signals to different UEs, and the different pilot signals correspond to information about beams of the different UEs. The base station obtains the information about the beams of the different UEs, and the base station notifies the UE of the information about the beam in an indirect manner. The information about the beam of the UE may be an identifier of the beam, and certainly, the information about the beam may also be attribute information of the beam. The base station establishes, for information about a beam of each UE, a correspondence between the information about the beam and a pilot signal, and the base station sends, to each UE, a pilot signal corresponding to the information about the beam of the UE. For example, a same base station manages three UEs. The base station obtains three different pilot signals, and establishes correspondences between the pilot signals and information about beams of the UEs. Information about a beam of UE 1 corresponds to a pilot signal 1, information about a beam of UE 2 corresponds to a pilot signal 2, and information about a beam of UE 3 corresponds to a pilot signal 3. If the base station sends the pilot signal 1 to the UE 1, after the UE 1 receives the pilot signal 1, the UE 1 obtains, based on the correspondences between the pilot signals and the information about the beams of the UEs, the information about the beam that corresponds to the pilot signal 1. Processing for the other two UEs is similar to this.

In an implementation shown in A3 in the present invention, the value of the synchronization sequence on the antenna port of the UE corresponding to the $i^{th}$ broadcast channel in the N broadcast channels corresponds to the indication information of the antenna port of the UE corresponding to the $i^{th}$ broadcast channel, or the value of the synchronization sequence on the antenna port group of the UE corresponding to the $i^{th}$ broadcast channel in the N broadcast channels corresponds to the indication information of the antenna port group of the UE corresponding to the $i^{th}$ broadcast channel. The base station determines different sequence values for synchronization sequences (SS) in different beams. Different synchronization sequences correspond to information about beams of different UEs. The base station obtains the information about the beams of the different UEs, and the base station notifies the UE of the information about the beam in an indirect manner. For example, the base station establishes, for information about a beam of each UE, a correspondence between the information about the beam and a synchronization sequence in the beam, and the base station sends, to each UE, the synchronization sequence in the beam that corresponds to the information about the beam of the UE. For example, a same base station manages three UEs. The base station obtains synchronization sequences in three different beams, and establishes correspondences between the synchronization sequences in the beams and information about the beams of the UEs. Information about a beam of UE 1 corresponds to a synchronization sequence 1 in the beams, information about a beam of UE 2 corresponds to a synchronization sequence 2 in the beams, and information about a beam of UE 3 corresponds to a synchronization sequence 3 in the beams. If the base station sends the synchronization sequence 1 in the beams to the UE 1, after the UE 1 receives the synchronization sequence 1 in the beams, the UE 1 obtains, based on the correspondences between the synchronization sequences in the beams and the information about the beams of the UEs, the information about the beam that corresponds to the synchronization sequence 1 in the beams. Processing for the other two UEs is similar to this.

In an implementation shown in A4 in the present invention, the scrambling code that is used when the data block carried on the $i^{th}$ broadcast channel in the N broadcast channels is scrambled corresponds to the indication information of the antenna port or the antenna port group of the UE corresponding to the $i^{th}$ broadcast channel. The base station scrambles data blocks in beams of different UEs by using different scrambling codes, and the different scrambling codes correspond to information about the beams of the different UEs. The base station obtains the information about the beams of the different UEs, and the base station notifies the UE of the information about the beam in an indirect manner. For example, the base station establishes, for information about a beam of each UE, a correspondence between the information about the beam and a scrambling code, and the base station respectively scrambles, by using different scrambling codes, data blocks sent to the UEs. For example, a same base station manages three UEs. The base station obtains three different scrambling codes, and establishes correspondence between the different scrambling codes and information about beams of the UEs. Information about a beam of UE 1 corresponds to a scrambling code 1, information about a beam of UE 2 corresponds to a scrambling code 2, and information about a beam of UE 3 corresponds to a scrambling code 3. If the base station sends a scrambled code block to the UE 1, after the UE 1 obtains the scrambling code 1, the UE 1 obtains, based on the correspondences between the scrambling codes and the information about the beams of the UEs, the information about the beam that corresponds to the scrambling code 1. Processing for the other two UEs is similar to this.

202: The base station scrambles the data blocks carried on the N broadcast channels, to obtain scrambled code blocks carried on the N broadcast channels.

In this embodiment of the present invention, after the base station obtains the data blocks carried on the N broadcast channels, the base station needs to separately scramble the data blocks carried on the N broadcast channels, to obtain the scrambled code blocks carried on the N broadcast channels. After the base station scrambles a data block carried on each of the N broadcast channels by using a scrambling code, the scrambled code blocks carried on the N broadcast channels can be obtained.

In some embodiments of the present invention, step 202 of scrambling, by the base station, the data blocks carried on the N broadcast channels, to obtain scrambled code blocks carried on the N broadcast channels specifically includes the following steps:

B1: The base station scrambles, by using a first scrambling code, a data block carried on each of the N broadcast channels, to obtain N first scrambled code blocks carried on the N broadcast channels; and/or B2: the base station scrambles, by using a second scrambling code, a data block carried on each of the N broadcast channels, to obtain N second scrambled code blocks carried on the N broadcast channels, where the first scrambling code and the second scrambling code are different scrambling codes.

In this embodiment of the present invention, the base station may scramble the data blocks carried on the N broadcast channels by using different scrambling codes. When the base station scrambles a same data block by using different scrambling codes, different scrambled code blocks can be obtained. Specifically, the two scrambling codes (the first scrambling code and the second scrambling code) in step B1 and step B2 are used as an example for description. If the base station scrambles the data block carried on each of the N broadcast channels by using the first scrambling code, the N first scrambled code blocks carried on the N broadcast channels are obtained. If the base station scrambles the data block carried on each of the N broadcast channels by using the second scrambling code, the N second scrambled code blocks carried on the N broadcast channels are obtained. Similarly, if the base station scrambles, by using four scrambling codes (the first scrambling code, the second scrambling code, a third scrambling code, and a fourth scrambling code respectively), the data blocks carried on the N broadcast channels, N third scrambled code blocks carried on the N broadcast channels and N fourth scrambled code blocks carried on the N broadcast channels can be obtained.

It should be noted that, in the foregoing embodiment of the present invention, the base station scrambles, in a same data transmission period by using a same scrambling code, the data block carried on each of the N broadcast channels, and the base station scrambles, in different data transmission periods by using different scrambling codes, the data block carried on each of the N broadcast channels, so that the UE can determine, by using different scrambling codes used by the base station, a data transmission period in which the base station transmits the scrambled code block.

In this embodiment of the present invention, after the base station respectively determines different broadcast channels for different antenna ports (or antenna port groups), the base station separately scrambles data blocks carried on the broadcast channels corresponding to the different antenna ports (or antenna port groups). If the base station needs to respectively send the N broadcast channels to N UEs, for an antenna port (or an antenna port group) of each UE, the base station scrambles, in a same data transmission period by using different scrambling codes, data blocks carried on broadcast channels belonging to a same antenna port (or antenna port group), and for different corresponding UEs, the base station scrambles, on different time resource units in a same data transmission period, broadcast channels corresponding to different antenna ports (or antenna port groups). Therefore, after the base station completes scrambling, for each antenna port (or antenna port group), after the broadcast channels are scrambled in a same data transmission period by using different scrambling codes, a plurality of scrambled code blocks are obtained. The plurality of scrambled code blocks are correlated. It should be noted that, in this embodiment of the present invention, a time resource unit is specifically a frame or a subframe or another resource used to distinguish between different time. In addition, a data transmission period is a period including a plurality of time resource units, for example, one data transmission period includes eight time resource units. Specific implementations of the time resource unit and the data transmission period need to be specifically determined in combination with an application scenario.

In some embodiments of the present invention, step 203 of sending, by the base station on different time resource units by respectively using the N antenna ports, corresponding scrambled code blocks carried on the broadcast channels may specifically include the following steps:

C1: The base station respectively sends the N first scrambled code blocks on N time resource units in a first data transmission period by using the N antenna ports, where an $i^{th}$ first scrambled code block in the N first scrambled code blocks is sent on the $i^{th}$ antenna port in the N antenna ports; and/or C2: the base station respectively sends the N second scrambled code blocks on N time resource units in a second data transmission period by using the N antenna ports, where an $i^{th}$ second scrambled code block in the N second scrambled code blocks is sent on the $i^{th}$ antenna port in the N antenna ports, and the second data transmission period is a data transmission period adjacent to the first data transmission period in time.

In some other embodiments of the present invention, step 203 of sending, by the base station on different time resource units by respectively using the N antenna port groups, corresponding scrambled code blocks carried on the broadcast channels includes the following steps:

D1: The base station respectively sends the N first scrambled code blocks on N time resource units in a first data transmission period by using the N antenna port groups, where an $i^{th}$ first scrambled code block in the N first scrambled code blocks is sent on the $i^{th}$ antenna port group in the N antenna port groups; and/or D2: the base station respectively sends the N second scrambled code blocks on N time resource units in a second data transmission period by using the N antenna port groups, where an $i^{th}$ second scrambled code block in the N second scrambled code blocks is sent on the $i^{th}$ antenna port group in the N antenna port groups, and the second data transmission period is a data transmission period adjacent to the first data transmission period in time.

Implementations of step C1 and step C2 are similar to implementations of step D1 and step D2, and a difference lies in whether a scrambled code block is sent by using an antenna port or an antenna port group. Using the implementations of step C1 and step C2 as an example, two adjacent data transmission periods are set, the second data transmission period is a data transmission period adjacent to the first data transmission period in time, and data is transmitted in the first data transmission period before the second data transmission period. If there are the N antenna ports, after the data blocks carried on the N broadcast channels are scrambled by using the first scrambling code, the N first scrambled code blocks are obtained, and after the data blocks carried on the N broadcast channels are scrambled by using the second scrambling code, the N second scrambled code blocks are obtained. The $i^{th}$ first scrambled code block in the N first scrambled code blocks is transmitted on the $i^{th}$ antenna port in the first data transmission period, and the $i^{th}$ second scrambled code block in the N second scrambled code blocks is transmitted on the $i^{th}$ antenna port in the second data transmission period, so that the UE corresponding to the $i^{th}$ broadcast channel receives the $i^{th}$ first scrambled code block in the first data transmission period, and the UE receives the $i^{th}$ second scrambled code block in the second data transmission period. The $i^{th}$ first scrambled code block and the $i^{th}$ second scrambled code block are scrambled code blocks that are obtained after the base station separately scrambles, by using different scrambling codes (that is, the first scrambling code and the second scrambling code), a same data block carried on the $i^{th}$ broadcast channel. The UE may descramble the $i^{th}$ first scrambled code block, or may descramble the $i^{th}$ second scrambled code block, or may combine the $i^{th}$ first scrambled code block and the $i^{th}$ second scrambled code block after failing in descrambling the $i^{th}$ first scrambled code block, and then descramble a result obtained through combination, thereby improving a correctness percentage of receiving, by the UE, the data block transmitted by the base station. The base station respectively sends the $i^{th}$ first scrambled code block and the $i^{th}$ second scrambled code block to the same UE in the two different data transmission periods. Therefore, in this embodiment of the present invention, a limitation that the base station needs to continuously send data of same UE is not imposed, and the base station does not need to continuously send data as in the prior art. Therefore, the data transmission method provided in this embodiment of the present invention is applicable to a multibeam system.

In some embodiments of the present invention, a system frame number (SFN) a cell system frame number counter. The SFN is included in a system information and is broadcast to an entire cell on a broadcast channel, and is used for a paging group and system information scheduling. This embodiment of the present invention provides an SFN transmission solution in a plurality of beams. In the solution, SFN information is distributed to a plurality of carriers for carrying, and then, on a UE side, after general information is obtained, combination is performed to calculate a value of the SFN. The carrier includes, but is not limited to, a position of an antenna port (an antenna port group) of UE, a scrambling code used for a data block, and SFN information included in a system information on a broadcast channel.

In some embodiments of the present invention, after step 202 of scrambling, by the base station, the data blocks carried on the N broadcast channels, to obtain scrambled code blocks carried on the N broadcast channels, the data transmission method provided in this embodiment of the present invention may further include the following steps:

E1: The base station indicates, by using system information on the $i^{th}$ broadcast channel in the N broadcast channels, first part information of a system frame number SFN of the UE corresponding to the $i^{th}$ broadcast channel.

E2: The base station indicates second part information of the SFN by using a quantity of scrambled code blocks sent to the UE corresponding to the $i^{th}$ broadcast channel, where the SFN consists of the first part information and the second part information.

In implementations of step E1 and step E2, the SFN consists of the first part information and the second part information. The first part information may be indicated by using the system information on the $i^{th}$ broadcast channel, and the second part information may be indicated by using the quantity of scrambled code blocks of the UE corresponding to the $i^{th}$ broadcast channel. The first part information may be used to indicate high-order bit information of the SFN, and the second part information may be used to indicate low-order bit information of the SFN. Alternatively, the first part information may be used to indicate low-order bit information of the SFN, and the second part information may be used to indicate high-order bit information of the SFN.

In addition, in this embodiment of the present invention, the SFN consists of the first part information and the second part information. If there are x bit positions in total in the SFN, the first part information may indicate y bit positions in the SFN, and the second part information indicates z bit positions in the SFN, where x, y, and z all indicate natural numbers, and x=y+z. In addition, specific values of x, y, and z may be configured in a specific application scenario, and are not specifically limited herein.

In some other embodiments of the present invention, after step 202 of scrambling, by the base station, the data blocks carried on the N broadcast channels, to obtain scrambled code blocks carried on the N broadcast channels, the data transmission method provided in this embodiment of the present invention may further include the following steps:

F1: The base station indicates, by using system information on the $i^{th}$ broadcast channel in the N broadcast channels, first part information of a system frame number SFN of the UE corresponding to the $i^{th}$ broadcast channel.

F2: The base station indicates third part information of the SFN by using position information of the antenna port or the antenna port group of the UE corresponding to the $i^{th}$ broadcast channel, where the SFN consists of the first part information and the third part information.

In implementations of step F1 and step F2, the SFN consists of the first part information and the third part information. The first part information may be indicated by using the system information on the $i^{th}$ broadcast channel, and the third part information may be indicated by using the antenna port (the antenna port group) of the UE corresponding to the $i^{th}$ broadcast channel. The first part information may be used to indicate high-order bit information of the SFN, and the third part information may be used to indicate low-order bit information of the SFN. Alternatively, the first part information may be used to indicate low-order bit information of the SFN, and the third part information may be used to indicate high-order bit information of the SFN.

In addition, in this embodiment of the present invention, the SFN consists of the first part information and the third part information. If there are x bit positions in total in the SFN, the first part information may indicate y bit positions in the SFN, and the third part information indicates z bit positions in the SFN, where x, y, and z all indicate natural numbers, and x=y+z. In addition, specific values of x, y, and z may be configured in a specific application scenario, and are not specifically limited herein.

In some other embodiments of the present invention, after step 202 of scrambling, by the base station, the data blocks carried on the N broadcast channels, to obtain scrambled code blocks carried on the N broadcast channels, the data transmission method provided in this embodiment of the present invention may further include the following steps:

G1: The base station indicates, by using system information on the $i^{th}$ broadcast channel in the N broadcast channels, first part information of a system frame number SFN of the UE corresponding to the $i^{th}$ broadcast channel.

G2: The base station indicates second part information of the SFN by using a quantity of scrambled code blocks sent to the UE corresponding to the $i^{th}$ broadcast channel.

G3: The base station indicates third part information of the SFN by using position information of the antenna port or the antenna port group of the UE corresponding to the $i^{th}$ broadcast channel, where the SFN consists of the first part information, the second part information, and the third part information.

In implementations of step G1 to step G3, the SFN consists of the first part information, the second part information, and the third part information. The first part information may be indicated by using the system information on the $i^{th}$ broadcast channel, the second part information may be indicated by using the quantity of scrambled code blocks of the UE corresponding to the $i^{th}$ broadcast channel, and the third part information may be indicated by using the antenna port (the antenna port group) of the UE corresponding to the $i^{th}$ broadcast channel. The first part information may be used to indicate high-order bit information of the SFN, the second part information may be used to indicate medium-order bit information of the SFN, and the third part information may be used to indicate low-order bit information of the SFN. Alternatively, the first part information may be used to indicate high-order bit information of the SFN, the second part information may be used to indicate low-order bit information of the SFN, and the third part information may be used to indicate medium-order bit information of the SFN. Alternatively, the first part information may be used to indicate medium-order bit information of the SFN, the second part information may be used to indicate high-order bit information of the SFN, and the third part information may be used to indicate low-order bit information of the SFN. Alternatively, the first part information may be used to indicate medium-order bit information of the SFN, the second part information may be used to indicate low-order bit information of the SFN, and the third part information may be used to indicate high-order bit information of the SFN. Alternatively, the first part information may be used to indicate low-order bit information of the SFN, the second part information may be used to indicate medium-order bit information of the SFN, and the third part information may be used to indicate high-order bit information of the SFN. Alternatively, the first part information may be used to indicate low-order bit information of the SFN, the second part information may be used to indicate high-order bit information of the SFN, and the third part information may be used to indicate medium-order bit information of the SFN.

In addition, in this embodiment of the present invention, the SFN consists of the first part information, the second part information, and the third part information. If there are x bit positions in total in the SFN, the first part information may indicate y bit positions in the SFN, the second part information indicates z1 bit positions in the SFN, and the third part information indicates z2 bit positions in the SFN, where x, y, z1, and z2 all indicate natural numbers, and x=y+z1+z2. In addition, specific values of x, y, z1, and z2 may be configured in a specific application scenario, and are not specifically limited herein.

Further, in some embodiments of the present invention, for the second part information, a quantity of bit positions in the SFN that are occupied by the second part information is determined based on a value of N. To be specific, in the descriptions of the foregoing example, the value of z1 may be determined based on the value of N.

Further, in some embodiments of the present invention, for the third part information, a quantity of bit positions in the SFN that are occupied by the third part information of the SFN is determined based on a quantity of scrambled code blocks sent to the UE corresponding to the $i^{th}$ broadcast channel. To be specific, in the descriptions of the foregoing example, the value of z2 may be determined based on a value of a quantity of scrambled code blocks received by the UE.

Next, the present invention is described by using an example. An example in which the first part information may be used to indicate high-order bit information of the SFN, the second part information may be used to indicate medium-order bit information of the SFN, and the third part information may be used to indicate low-order bit information of the SFN is used for description. A specific example is as follows. It is assumed that:

a beam ID carries information about the last n bits in the SFN, and the beam ID is marked as $X_{ID}^{Beam}$;

a scrambling code carries information about two bits in the middle in the SFN, and a currently received $X_{scramble}^{th}$ scrambled code block is marked; and a system information on a PBCH carries high-order bit information of the SFN, and the high-order bit information is marked as $X_{PBCH}^{SFN}$.

Based on the foregoing three pieces of information, the value of the SFN may be calculated in the following manner: $SFN = X_{PBCH}^{SFN} \times 2^{n+2} + X_{scramble} \times 2^n + X_{ID}^{Beam}$.

According to the foregoing SFN sending manner provided in this embodiment of the present invention, a quantity of bits in the SFN that are carried in the system information on the PBCH can be reduced, to be specific, only some bits in the complete SFN need to be carried in the system information on the PBCH, and remaining bits are carried by using another carrier. In this embodiment of the present invention, SFN information is divided for sending, and is sent by using different carriers. More SFN information is carried by using other information that needs to be sent, so that bits in the SFN information that needs to be sent are further reduced.

In some embodiments of the present invention, SFN sending may be correlated with other factors. These factors do not directly carry specific information of the SFN, but affect a specific calculation manner of the SFN or affect the value of the SFN. These factors include, but are not limited to, a quantity of beams, or the like. The quantity of bit positions in the SFN that are occupied by the second part information is determined based on the value of N. A specific example is as follows. It is assumed that:

there are three cases for a quantity of beams in a cell: 4/8/16;

a beam ID carries information about the last n/m/k bits in the SFN, and the beam ID is marked as $X_{ID}^{Beam}$, which respectively correspond to scenarios in which a quantity of beams is 4/8/16, to be specific, if the quantity of beams is 4, the beam ID carries the information about the last n bits in the SFN; if the quantity of beams is 8, the beam ID carries the information about the last m bits in the SFN; or if the quantity of beams is 16, the beam ID carries the information about the last k bits in the SFN;

a scrambling code carries information about two bits in the middle in the SFN, and a currently received $n_{block}$, $n_{block} \in \{0, 1, 2, 3\}_{th}$ scrambled code block is marked, which respectively correspond to the scenarios in which the quantity of beams is 4/8/16; and a system information on a PBCH carries high-order bit information of the SFN, and the high-order bit information is marked as $n_{first}^{SFN}$.

Based on the foregoing information, a process of calculating the value of SFN is as follows:

$$SFN = \begin{cases} n_{first}^{SFN} \times 2^{n+2} + n_{block} \times 2^n + X_{ID}^{Beam} & N_{beam} = 4 \\ n_{first}^{SFN} \times 2^{m+2} + n_{block} \times 2^m + X_{ID}^{Beam} & N_{beam} = 8 \\ n_{first}^{SFN} \times 2^{k+2} + n_{block} \times 2^k + X_{ID}^{Beam} & N_{beam} = 16 \end{cases}$$

In some embodiments of the present invention, SFN sending may be correlated with other factors. These factors do not directly carry specific information of the SFN, but affect a specific calculation manner of the SFN or affect the value of the SFN. These factors include, but are not limited to, a quantity of beams, or the like. The quantity of bit positions in the SFN that are occupied by the second part information is determined based on the value of N. The quantity of bit positions in the SFN that are occupied by the third part information is determined based on the quantity of scrambled code blocks sent to the UE corresponding to the $i^{th}$ broadcast channel. In some embodiments of the present invention, a quantity of scrambled code blocks on a PBCH that can be combined is used to indicate a quantity of bits that can be carried by a scrambling code. For example, if a quantity of scrambled code blocks on the PBCHs is p, and p=2q, to be specific, the quantity of code blocks is 2 to the power of q, the quantity of bits that that can be carried by a scrambling code on the PBCH may be q. A larger p indicates a larger quantity of bits that can be carried, but a PBCH update period is affected. A specific example is as follows. It is assumed that:

a value of a quantity of beams in a cell may be 4/8/16;

a beam ID carries information about the last n/m/k bits, and the beam ID is marked as $X_{ID}^{Beam}$, which respectively correspond to scenarios in which a quantity of beams is 4/8/16, to be specific, if the quantity of beams is 4, the beam ID carries the information about the last n bits in the SFN; if the quantity of beams is 8, the beam ID carries the information about the last m bits in the SFN; or if the quantity of beams is 16, the beam ID carries the information about the last k bits in the SFN;

a scrambling code carries information about q bits in the middle in the SFN, and a currently received $n_{block}$, $n_{block} \in \{0, 1, 2, \ldots, p-1=2^q-1\}_{th}$ scrambled code block is marked, which respectively correspond to the scenarios in which the quantity of beams is 4/8/16, to be specific, a larger value of the quantity p of scrambled code blocks indicates a larger value of q and more bit positions that can be carried by a scrambling code; compared with the foregoing embodiment, a quantity of positions in the middle that are carried by a scrambling code is not a fixed value, and is determined based on the quantity of scrambled code blocks received by the UE; and a system information on a PBCH carries high-order bit information of the SFN, and the high-order bit information is marked as $n_{first}^{SFN}$.

Based on the foregoing information, the value of SFN is calculated as follows:

$$SFN = \begin{cases} n_{first}^{SFN} \times 2^{n+q} + n_{block} \times 2^n + X_{ID}^{Beam} & N_{beam} = 4 \\ n_{first}^{SFN} \times 2^{m+q} + n_{block} \times 2^m + X_{ID}^{Beam} & N_{beam} = 8 \\ n_{first}^{SFN} \times 2^{k+q} + n_{block} \times 2^k + X_{ID}^{Beam} & N_{beam} = 16 \end{cases}$$

203: The base station sends, on different time resource units by respectively using the N antenna ports, corresponding scrambled code blocks carried on the broadcast channels, or the base station sends, on different time resource units by respectively using the N antenna port groups, corresponding scrambled code blocks carried on the broadcast channels.

In this embodiment of the present invention, after the base station scrambles a data block carried on a broadcast channel corresponding to each antenna port (or antenna port group), a plurality of scrambled code blocks are obtained. The base station respectively sends, to different UEs on different time resource units, scrambled code blocks corresponding to different antenna ports (or antenna port groups). For example, a same base station manages three UEs. The base station sends, to the three UEs in a time division manner, scrambled code blocks carried on three broadcast channels, and sends, to different UEs, scrambled code blocks carried on broadcast channels corresponding to different antenna ports (or antenna port groups). For example, the base station may send, on different frames based on different antenna ports (or antenna port groups), scrambled code blocks carried on a broadcast channel or send, in different subframes, scrambled code blocks carried on a broadcast channel.

Figure 4:
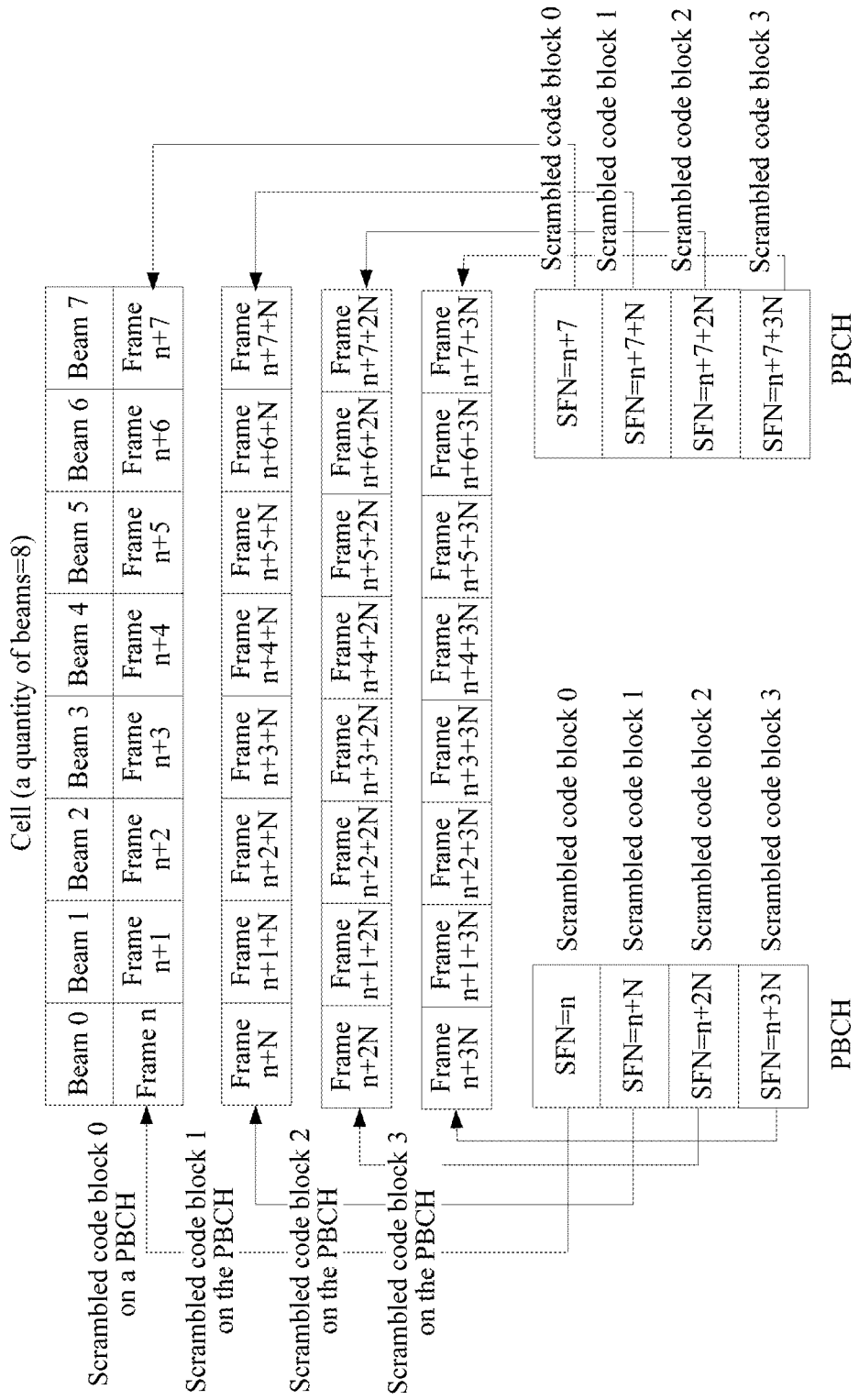
FIG. 4 is a schematic diagram of sending scrambled code blocks carried on a broadcast channel according to an embodiment of the present invention.

Referring to FIG. 4, FIG. 4 is a schematic diagram of sending scrambled code blocks carried on a broadcast channel according to an embodiment of the present invention. An example in which there are eight beams in a cell is used. The eight beams are respectively a beam 0, a beam 1, a beam 2, a beam 3, a beam 4, a beam 5, a beam 6, and a beam 7. The beam 0 corresponds to four frames that are respectively a frame n, a frame n+N, a frame n+2N, and a frame n+3N, ..., and the beam 7 corresponds to four frames that are respectively a frame n+7, a frame n+7+N, a frame n+7+2N, and a frame n+7+3N. The base station respectively generates four scrambled code blocks (a scrambled code block 0, a scrambled code block 1, a scrambled code block 2, and a scrambled code block 3) in four different data transmission periods for each UE. Different scrambling codes are used for data blocks carried on a same PBCH, and four scrambled code blocks (the scrambled code block 0, the scrambled code block 1, the scrambled code block 2, and the scrambled code block 3) are generated respectively. The scrambled code block 0 on the PBCH is sent, on eight frames whose SFNs are n to n+7, to eight UEs corresponding to the eight beams, the scrambled code block 1 on the PBCH is sent, on eight frames whose SFNs are n+N to n+N+7, to the eight UEs corresponding to the eight beams, the scrambled code block 2 on the PBCH is sent, on eight frames whose SFNs are n+2N to n+2N+7, to the eight UEs corresponding to the eight beams, and the scrambled code block 3 on the PBCH is sent, on eight frames whose SFNs are n+3N to n+3N+7, to the eight UEs corresponding to the eight beams.

As shown in FIG. 4, the base station independently sends a PBCH in each beam in a time division manner, and sends different beams on different frames. In addition, sending of PBCHs in a single beam is correlated. To be specific, different scrambled code blocks in a same data transmission period are obtained after a PBCH is scrambled by using different scrambling codes. A plurality of scrambled code blocks on a PBCH that are sent by the base station on different time resource units and on a same beam can be combined. To be specific, code blocks of a PBCH in a single beam that can be combined are sent on different time resource units and on a same beam, and scrambling codes of the scrambled code blocks are different. Different scrambled code blocks can be identified by using different scrambling codes. As shown in FIG. 4, an example in which one time resource unit is one frame is used. Sending of each beam occupies a time of one frame. Therefore, a data transmission period of eight beams is eight frames, but in a single beam, every four code blocks are a period of a MIB. After the UE receives a PBCH, the UE may independently descramble each scrambled code block, or the UE may descramble a plurality of received scrambled code blocks at the same time. After the plurality of scrambled code blocks are descrambled, a MIB can be generated.

A PBCH sending solution provided in this embodiment of the present invention is applicable to a multibeam scenario for PBCHs. Joint descrambling for PBCHs can be implemented on a same beam in a time division scanning manner, thereby expanding coverage of the PBCHs. This embodiment of the present invention provides a PBCH transmission solution in a time division scanning manner for a multibeam system. Joint descrambling for PBCHs can be implemented on a same beam, and a beam ID and a scrambling code are fully used, to implement an SFN carrying mechanism in which information bits in an SFN on a PBCH are further reduced.

It may be learned from the descriptions of the present invention in the foregoing embodiment, the base station determines the plurality of data blocks carried on the N broadcast channels, where the $i^{th}$ broadcast channel in the N broadcast channels corresponds to the $i^{th}$ antenna port in the N antenna ports, or the $i^{th}$ broadcast channel in the N broadcast channels corresponds to the antenna port group in the N antenna port groups; the base station scrambles the data blocks carried on the N broadcast channels, to obtain the scrambled code blocks carried on the N broadcast channels; and the base station sends, on the different time resource units by respectively using the N antenna ports, the corresponding scrambled code blocks carried on the broadcast channels, or the base station sends, on the different time resource units by respectively using the N antenna port groups, the corresponding scrambled code blocks carried on the broadcast channels. The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

The data transmission method is described from a perspective of the base station side in the foregoing embodiment. Next, a data transmission method provided in the present invention is described from a perspective of a peer end (user equipment) side of the base station is described. Referring to FIG. 5, FIG. 5 shows a data transmission method provided in another embodiment of the present invention. The method may include the following steps.

501: UE receives, on a time resource unit corresponding to the UE, a scrambled code block that is carried on an $i^{th}$ broadcast channel in N broadcast channels and that is sent by a base station by using an $i^{th}$ antenna port in N antenna ports, or receives, on a time resource unit corresponding to the UE, a scrambled code block that is carried on an $i^{th}$ broadcast channel in N broadcast channels and that is sent by the base station by using an $i^{th}$ antenna port group in N antenna port groups.

N is a positive integer, i is a positive integer greater than 0 and less than or equal to N, and the UE corresponds to the $i^{th}$ antenna port or the $i^{th}$ antenna port group.

In this embodiment of the present invention, the base station respectively sends scrambled code blocks to N UEs by using the N antenna ports, where each antenna port is used to send a scrambled code block to one UE. Alternatively, the base station respectively sends scrambled code blocks to N UEs by using the N antenna port groups, where each antenna port group is used to send a scrambled code block to one UE. One of the N UEs is used as an example for description in this embodiment of the present invention. The base station respectively sends scrambled code blocks to the N UEs on different time resource units, so that each UE can receive, on a time resource unit corresponding to the UE, a scrambled code block sent by the base station to the UE. For the UEs, the base station sends the scrambled code blocks to the N UEs in a time division manner. For example, a same base station manages three UEs. The base station sends PBCHs to the three UEs in a time division manner, and sends, to different UEs, PBCHs corresponding to different beams. For example, the base station may send PBCHs on different frames based on different beams, or send PBCHs in different subframes. Each UE obtains, on a time resource unit corresponding to the UE, the PBCH sent by the base station.

In some embodiments of the present invention, step 501 of receiving, by UE on a time resource unit corresponding to the UE, a scrambled code block that is carried on an $i^{th}$ broadcast channel in N broadcast channels and that is sent by a base station by using an $i^{th}$ antenna port in N antenna ports specifically includes the following steps:

H1: The UE receives, on an $i^{th}$ time resource unit in a first data transmission period, an $i^{th}$ first scrambled code block that is carried on the $i^{th}$ broadcast channel and that is sent by the base station by using the $i^{th}$ antenna port in the N antenna ports; and/or H2: the UE receives, on an $i^{th}$ time resource unit in a second data transmission period, an $i^{th}$ second scrambled code block that is carried on the $i^{th}$ broadcast channel and that is sent by the base station by using the $i^{th}$ antenna port in the N antenna ports, where the second data transmission period is a data transmission period adjacent to the first data transmission period.

In some other embodiments of the present invention, step 501 of receiving, by UE on a time resource unit corresponding to the UE, a scrambled code block that is carried on an $i^{th}$ broadcast channel in N broadcast channels and that is sent by a base station by using an $i^{th}$ antenna port in N antenna ports specifically includes the following steps:

I1: The UE receives, on an $i^{th}$ time resource unit in a first data transmission period, an $i^{th}$ first scrambled code block that is carried on the $i^{th}$ broadcast channel and that is sent by the base station by using the $i^{th}$ antenna port group in the N antenna port groups; and/or I2: the UE receives, on an $i^{th}$ time resource unit in a second data transmission period, an $i^{th}$ second scrambled code block that is carried on the $i^{th}$ broadcast channel and that is sent by the base station by using the $i^{th}$ antenna port group in the N antenna port groups, where the second data transmission period is a data transmission period adjacent to the first data transmission period.

Implementations of step H1 and step H2 are similar to implementations of step I1 and step I2, and a difference lies in whether a scrambled code block is received by using an antenna port or an antenna port group. The implementations of step H1 and step H2 are used as an example. In the foregoing embodiment of the present invention, in an implementation scenario shown in step C1 and step C2, the base station respectively sends the N first scrambled code blocks and the N second scrambled code blocks in the first data transmission period and the second data transmission period by using the N antenna ports, and correspondingly, on a UE side, two adjacent data transmission periods are determined, the second data transmission period is a data transmission period adjacent to the first data transmission period in time, and data is transmitted in the first data transmission period before the second data transmission period. If there are the N antenna ports, the $i^{th}$ first scrambled code block in the N first scrambled code blocks is transmitted on the $i^{th}$ antenna port in the first data transmission period, and the $i^{th}$ second scrambled code block in the N second scrambled code blocks is transmitted on the $i^{th}$ antenna port in the second data transmission period, so that the UE corresponding to the $i^{th}$ broadcast channel receives the $i^{th}$ first scrambled code block in the first data transmission period, and the UE receives the $i^{th}$ second scrambled code block in the second data transmission period. The $i^{th}$ first scrambled code block and the $i^{th}$ second scrambled code block are scrambled code blocks that are obtained after the base station separately scrambles, by using different scrambling codes (that is, a first scrambling code and a second scrambling code), a same data block carried on the $i^{th}$ broadcast channel. The base station respectively sends the $i^{th}$ first scrambled code block and the $i^{th}$ second scrambled code block to the same UE in the two different data transmission periods. Therefore, in this embodiment of the present invention, a limitation that the base station needs to continuously send data of same UE is not imposed, and the base station does not need to continuously send data as in the prior art. Therefore, the data transmission method provided in this embodiment of the present invention is applicable to a multibeam system.

In some embodiments of the present invention, before the UE receives the scrambled code block carried on the $i^{th}$ broadcast channel in the N broadcast channels, the UE may determine, based on an SFN carried on the $i^{th}$ broadcast channel, a time resource unit on which the UE receives the scrambled code block sent by the base station to the UE. This embodiment of the present invention provides an SFN transmission solution in a plurality of beams. In the solution, SFN information is distributed to a plurality of carriers for carrying, and then, on a UE side, after general information is obtained, combination is performed to calculate a value of the SFN. The carrier includes, but is not limited to, a position of an antenna port (an antenna port group) of UE, a scrambling code used for a data block, and SFN information included in a system information on a broadcast channel.

In some embodiments of the present invention, before step 501 of receiving, by UE, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the data transmission method provided in this embodiment of the present invention may further include the following steps:

J1: The UE obtains first part information of an SFN by using system information on the $i^{th}$ broadcast channel in the N broadcast channels.

J2: The UE obtains second part information of the SFN by using a quantity of scrambled code blocks received by the UE.

J3: The UE obtains the SFN by using the first part information and the second part information.

In implementations of step J1 to step J3, the SFN consists of the first part information and the second part information. The first part information may be indicated by using the system information on the $i^{th}$ broadcast channel, and the second part information may be indicated by using the quantity of scrambled code blocks of the UE corresponding to the $i^{th}$ broadcast channel. The first part information may be used to indicate high-order bit information of the SFN, and the second part information may be used to indicate low-order bit information of the SFN. Alternatively, the first part information may be used to indicate low-order bit information of the SFN, and the second part information may be used to indicate high-order bit information of the SFN.

In addition, in this embodiment of the present invention, the SFN consists of the first part information and the second part information. If there are x bit positions in total in the SFN, the first part information may indicate y bit positions in the SFN, and the second part information indicates z bit positions in the SFN, where x, y, and z all indicate natural numbers, and x=y+z. In addition, specific values of x, y, and z may be configured in a specific application scenario, and are not specifically limited herein.

In some other embodiments of the present invention, before step 501 of receiving, by UE, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the data transmission method provided in this embodiment of the present invention may further include the following steps:

K1: The UE obtains first part information of a system frame number SFN by using system information on the $i^{th}$ broadcast channel in the N broadcast channels.

K2: The UE obtains third part information of the SFN by using position information of the antenna port or the antenna port group of the UE.

K3: The UE obtains the SFN by using the first part information and the third part information.

In implementations of step K1 to step K3, the SFN consists of the first part information and the third part information. The first part information may be indicated by using the system information on the $i^{th}$ broadcast channel, and the third part information may be indicated by using the antenna port (the antenna port group) of the UE corresponding to the $i^{th}$ broadcast channel. The first part information may be used to indicate high-order bit information of the SFN, and the third part information may be used to indicate low-order bit information of the SFN. Alternatively, the first part information may be used to indicate low-order bit information of the SFN, and the third part information may be used to indicate high-order bit information of the SFN.

In addition, in this embodiment of the present invention, the SFN consists of the first part information and the third part information. If there are x bit positions in total in the SFN, the first part information may indicate y bit positions in the SFN, and the third part information indicates z bit positions in the SFN, where x, y, and z all indicate natural numbers, and x=y+z. In addition, specific values of x, y, and z may be configured in a specific application scenario, and are not specifically limited herein.

In some other embodiments of the present invention, before step 501 of receiving, by UE, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the data transmission method provided in this embodiment of the present invention may further include the following steps:

L1: The UE obtains first part information of a system frame number SFN by using system information on the $i^{th}$ broadcast channel in the N broadcast channels.

L2: The UE obtains second part information of the SFN by using a quantity of scrambled code blocks received by the UE.

L3: The UE obtains third part information of the SFN by using position information of the antenna port or the antenna port group of the UE.

L4: The UE obtains the SFN by using the first part information, the second part information, and the third part information.

In implementations of step L1 to step L4, the SFN consists of the first part information, the second part information, and the third part information. The first part information may be indicated by using the system information on the $i^{th}$ broadcast channel, the second part information may be indicated by using the quantity of scrambled code blocks of the UE corresponding to the $i^{th}$ broadcast channel, and the third part information may be indicated by using the antenna port (the antenna port group) of the UE corresponding to the $i^{th}$ broadcast channel. The first part information may be used to indicate high-order bit information of the SFN, the second part information may be used to indicate medium-order bit information of the SFN, and the third part information may be used to indicate low-order bit information of the SFN. Alternatively, the first part information may be used to indicate high-order bit information of the SFN, the second part information may be used to indicate low-order bit information of the SFN, and the third part information may be used to indicate medium-order bit information of the SFN. Alternatively, the first part information may be used to indicate medium-order bit information of the SFN, the second part information may be used to indicate high-order bit information of the SFN, and the third part information may be used to indicate low-order bit information of the SFN. Alternatively, the first part information may be used to indicate medium-order bit information of the SFN, the second part information may be used to indicate low-order bit information of the SFN, and the third part information may be used to indicate high-order bit information of the SFN. Alternatively, the first part information may be used to indicate low-order bit information of the SFN, the second part information may be used to indicate medium-order bit information of the SFN, and the third part information may be used to indicate high-order bit information of the SFN. Alternatively, the first part information may be used to indicate low-order bit information of the SFN, the second part information may be used to indicate high-order bit information of the SFN, and the third part information may be used to indicate medium-order bit information of the SFN.

In addition, in this embodiment of the present invention, the SFN consists of the first part information, the second part information, and the third part information. If there are x bit positions in total in the SFN, the first part information may indicate y bit positions in the SFN, the second part information indicates z1 bit positions in the SFN, and the third part information indicates z2 bit positions in the SFN, where x, y, z1, and z2 all indicate natural numbers, and x=y+z1+z2. In addition, specific values of x, y, z1, and z2 may be configured in a specific application scenario, and are not specifically limited herein.

Further, in some embodiments of the present invention, for the second part information, a quantity of bit positions in the SFN that are occupied by the second part information is determined based on a value of N. To be specific, in the descriptions of the foregoing example, the value of z1 may be determined based on the value of N.

Further, in some embodiments of the present invention, for the third part information, a quantity of bit positions in the SFN that are occupied by the third part information of the SFN is determined based on a quantity of scrambled code blocks sent to the UE corresponding to the $i^{th}$ broadcast channel. To be specific, in the descriptions of the foregoing example, the value of z2 may be determined based on a value of a quantity of scrambled code blocks received by the UE.

In some embodiments of the present invention, before step 501 of receiving, by UE, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the data transmission method provided in this embodiment of the present invention further includes the following steps:

M1: The UE obtains a value of N from value information carried on the $i^{th}$ broadcast channel; or M2: the UE obtains a value of N based on a mask of a CRC of the $i^{th}$ broadcast channel.

In some embodiments of the present invention, to enable a receive end (that is, UE) to obtain a value of N, the base station adds value information of N to the N broadcast channels; or the base station uses value information of N as masks of CRCs of the N broadcast channels. To be specific, the base station may add information about a quantity of antenna ports (or antenna port groups) to the N broadcast channels, so that the UE may obtain, from a broadcast channel corresponding to the UE, the information about the quantity of antenna ports (or antenna port groups) that is carried on the broadcast channel, and the UE may determine a specific value of N. In addition, in this embodiment of the present invention, the base station may use an indirect manner instead of using a direct manner (for example, the value information of N is carried by using the N broadcast channels). For example, the base station uses the value information of N as the masks of the CRCs of the N broadcast channels, and the UE may determine, by using a mask used by a CRC of the broadcast channel corresponding to the UE, the value of N used by the base station.

In some embodiments of the present invention, before step 501 of receiving, by UE, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, the data transmission method provided in this embodiment of the present invention further includes the following steps:

N1: The UE obtains indication information of the antenna port or the antenna port group of the UE based on indication information carried on the $i^{th}$ broadcast channel; or N2: the UE obtains indication information of the antenna port or the antenna port group of the UE based on a pilot signal carried on the $i^{th}$ broadcast channel; or N3: the UE obtains position information of the antenna port of the UE based on a value of a synchronization sequence on the antenna port of the UE, or the UE obtains position information of the antenna port group of the UE based on a value of a synchronization sequence on the antenna port group of the UE; or N4: the UE obtains position information of the antenna port or the antenna port group of the UE based on a scrambling code that is used when the scrambled code block carried on the $i^{th}$ broadcast channel is descrambled.

In an implementation shown in N1, the base station directly adds, to the $i^{th}$ broadcast channel, the indication information of the antenna port or the antenna port group of the UE corresponding to the $i^{th}$ broadcast channel, and the UE corresponding to the $i^{th}$ broadcast channel obtains, by receiving the indication information carried on the $i^{th}$ broadcast channel, the position of the antenna port or the antenna port group of the UE.

In an implementation shown in N2 in the present invention, the pilot signal carried on the $i^{th}$ broadcast channel in the N broadcast channels corresponds to the indication information of the antenna port or the antenna port group of the UE corresponding to the $i^{th}$ broadcast channel. To be specific, the base station uses different pilot signals for different UEs, and there is a correspondence between a pilot signal and an antenna port or an antenna port group of UE. For example, the base station sets different pilot signals for different broadcast channels. In this way, the UE can learn of information about a current beam of the UE by demodulating a pilot signal. The base station respectively sends different pilot signals to different UEs, and the different pilot signals correspond to information about beams of the different UEs. The base station obtains the information about the beams of the different UEs, and the base station notifies the UE of the information about the beam in an indirect manner. The information about the beam of the UE may be an identifier of the beam, and certainly, the information about the beam may also be attribute information of the beam. The base station establishes, for information about a beam of each UE, a correspondence between the information about the beam and a pilot signal, and the base station sends, to each UE, a pilot signal corresponding to the information about the beam of the UE. The UE obtains, based on the correspondence between the pilot signal and the information about the beam of the UE, the information about the beam that corresponds to the pilot signal.

In an implementation shown in N3 in the present invention, the value of the synchronization sequence on the antenna port of the UE corresponding to the $i^{th}$ broadcast channel in the N broadcast channels corresponds to the indication information of the antenna port of the UE corresponding to the $i^{th}$ broadcast channel, or the value of the synchronization sequence on the antenna port group of the UE corresponding to the $i^{th}$ broadcast channel in the N broadcast channels corresponds to the indication information of the antenna port group of the UE corresponding to the $i^{th}$ broadcast channel. The UE obtains, based on a correspondence between a synchronization sequence in a beam and information about a beam of the UE, the information about the beam that corresponds to the synchronization sequence in the beam.

In an implementation shown in N4 in the present invention, the scrambling code that is used when the data block carried on the $i^{th}$ broadcast channel in the N broadcast channels is scrambled corresponds to the indication information of the antenna port or the antenna port group of the UE corresponding to the $i^{th}$ broadcast channel. The base station scrambles data blocks in beams of different UEs by using different scrambling codes, and the different scrambling codes correspond to information about the beams of the different UEs. The base station obtains the information about the beams of the different UEs, and the base station notifies the UE of the information about the beam in an indirect manner. For example, the base station establishes, for information about a beam of each UE, a correspondence between the information about the beam and a scrambling code, and the base station respectively scrambles, by using different scrambling codes, data blocks sent to the UEs. The UE obtains, based on the correspondence between the scrambling code and the information about the beam of the UE, the information about the beam that corresponds to the scrambling code.

502: The UE descrambles the scrambled code block that is carried on the $i^{th}$ broadcast channel and that is received by using the $i^{th}$ antenna port or the $i^{th}$ antenna port group.

In this embodiment of the present invention, after the UE receives, by using the $i^{th}$ antenna port or the $i^{th}$ antenna port group, the scrambled code block carried on the $i^{th}$ broadcast channel, the UE may descramble the scrambled code block. After succeeding in the descrambling, the UE may obtain a data block that is carried on the $i^{th}$ broadcast channel and that is sent by the base station to the UE.

In some embodiments of the present invention, step 502 of descrambling, by the UE, the scrambled code block that is carried on the $i^{th}$ broadcast channel and that is received by using the $i^{th}$ antenna port or the $i^{th}$ antenna port group includes the following steps:

O1: The UE descrambles the $i^{th}$ first scrambled code block carried on the $i^{th}$ broadcast channel; or O2: the UE descrambles the $i^{th}$ second scrambled code block carried on the $i^{th}$ broadcast channel; or O3: the UE combines the $i^{th}$ first scrambled code block and the $i^{th}$ second scrambled code block that are carried on the $i^{th}$ broadcast channel, and then, descrambles the $i^{th}$ first scrambled code block and the $i^{th}$ second scrambled code block that are combined.

In the foregoing embodiment of the present invention, the base station respectively sends the N first scrambled code blocks and the N second scrambled code blocks in the first data transmission period and the second data transmission period. Therefore, the UE corresponding to the $i^{th}$ broadcast channel may receive the $i^{th}$ first scrambled code block in the first data transmission period, and the UE corresponding to the $i^{th}$ broadcast channel may receive the $i^{th}$ second scrambled code block in the second data transmission period. The UE may independently descramble the $i^{th}$ first scrambled code block or may independently descramble the $i^{th}$ second scrambled code block. Alternatively, the UE may jointly descramble the $i^{th}$ first scrambled code block and the $i^{th}$ second scrambled code block. For example, the UE obtains the $i^{th}$ first scrambled code block and the $i^{th}$ second scrambled code block that are sent by the base station on time resource units in the two data transmission periods. These scrambled code blocks are correlated. To improve a descrambling gain, the UE may combine a plurality of scrambled code blocks on a same broadcast channel that correspond to a same antenna port (or antenna port group) in the two data transmission periods, to obtain a plurality of combined scrambled code blocks. For example, the UE may descramble the $i^{th}$ first scrambled code block, or may descramble the $i^{th}$ second scrambled code block, or may combine the $i^{th}$ first scrambled code block and the $i^{th}$ second scrambled code block after failing in descrambling the $i^{th}$ first scrambled code block, and then descramble a result obtained through combination, thereby improving a correctness percentage of receiving, by the UE, the data block transmitted by the base station.

For example, in this embodiment of the present invention, after the UE obtains the plurality of combined scrambled code blocks on the same broadcast channel that belong to a same beam in the two data transmission periods, the UE may perform joint descrambling, to generate a MIB. Because the UE may perform joint descrambling on the plurality of combined scrambled code blocks on the PBCH that belong to a same beam on a time resource unit, a success ratio of descrambling can be improved. It should be noted that, in this embodiment of the present invention, the UE may perform joint descrambling on the plurality of combined scrambled code blocks. In addition, the UE may descramble a single scrambled code block. For a specific implementation means of descrambling, refer to the prior art.

It may be learned from the descriptions of the present invention in the foregoing embodiment, the UE receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups; and the UE descrambles the scrambled code block that is carried on the $i^{th}$ broadcast channel and that is received by using the $i^{th}$ antenna port or the $i^{th}$ antenna port group. The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

It should be noted that, for brief description, the foregoing method embodiments are represented as a series of actions. However, persons skilled in the art should appreciate that the present invention is not limited to the described order of the actions, because according to the present invention, some steps may be performed in other orders or simultaneously. In addition, persons skilled in the art should also know that all the embodiments described in this specification are examples, and the related actions and modules are not necessarily required in the present invention.

To better implement the foregoing solutions of the embodiments of the present invention, the following further provides related apparatuses for implementing the foregoing solutions.

Referring to FIG. 6-*a*, a base station 600 provided in an embodiment of the present invention may include an obtaining module 601, a scrambling module 602, and a transceiver module 603.

The obtaining module 601 is configured to determines a plurality of data blocks carried on N broadcast channels, where an $i^{th}$ broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups, where N is a positive integer, and i is a positive integer greater than 0 and less than or equal to N.

The scrambling module 602 is configured to scramble the data blocks carried on the N broadcast channels, to obtain scrambled code blocks carried on the N broadcast channels.

The transceiver module 603 is configured to: send, on different time resource units by respectively using the N antenna ports, corresponding scrambled code blocks carried on the broadcast channels, or send, on different time resource units by respectively using the N antenna port groups, corresponding scrambled code blocks carried on the broadcast channels.

In some embodiments of the present invention, the scrambling module 602 is specifically configured to: scramble, by using a first scrambling code, a data block carried on each of the N broadcast channels, to obtain N first scrambled code blocks carried on the N broadcast channels; and/or scramble, by using a second scrambling code, a data block carried on each of the N broadcast channels, to obtain N second scrambled code blocks carried on the N broadcast channels, where the first scrambling code and the second scrambling code are different scrambling codes.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

In some embodiments of the present invention, as shown in FIG. 6-b, the base station 600 further includes a first configuration module 604, configured to configure the following information: the $i^{th}$ broadcast channel in the N broadcast channels carries indication information of an antenna port or an antenna port group of user equipment UE corresponding to the $i^{th}$ broadcast channel; or a pilot signal carried on the $i^{th}$ broadcast channel in the N broadcast channels corresponds to indication information of an antenna port or an antenna port group of UE corresponding to the $i^{th}$ broadcast channel; or a value of a synchronization sequence on an antenna port of UE corresponding to the $i^{th}$ broadcast channel in the N broadcast channels corresponds to indication information of the antenna port of the UE corresponding to the $i^{th}$ broadcast channel, or a value of a synchronization sequence on an antenna port group of UE corresponding to the $i^{th}$ broadcast channel in the N broadcast channels corresponds to indication information of the antenna port group of the UE corresponding to the $i^{th}$ broadcast channel; or a scrambling code that is used when a data block carried on the $i^{th}$ broadcast channel in the N broadcast channels is scrambled corresponds to indication information of an antenna port or an antenna port group of UE corresponding to the $i^{th}$ broadcast channel.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

In some embodiments of the present invention, as shown in FIG. 6-c, the base station 600 further includes a second configuration module 605, configured to: after the scrambling module scrambles the data blocks carried on the N broadcast channels, to obtain the scrambled code blocks carried on the N broadcast channels, configure the following information: first part information of a system frame number SFN of the UE corresponding to the $i^{th}$ broadcast channel is indicated by using system information on the $i^{th}$ broadcast channel in the N broadcast channels; and/or second part information of the SFN is indicated by using a quantity of scrambled code blocks sent to the UE corresponding to the $i^{th}$ broadcast channel; and/or third part information of the SFN is indicated by using position information of the antenna port or the antenna port group of the UE corresponding to the $i^{th}$ broadcast channel.

The SFN consists of the first part information and the second part information, or the SFN consists of the first part information and the third part information, or the SFN consists of the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

In some embodiments of the present invention, the transceiver module 603 is specifically configured to: respectively send the N first scrambled code blocks on N time resource units in a first data transmission period by using the N antenna ports, where an $i^{th}$ first scrambled code block in the N first scrambled code blocks is sent on the $i^{th}$ antenna port in the N antenna ports; and/or respectively send the N second scrambled code blocks on N time resource units in a second data transmission period by using the N antenna ports, where an $i^{th}$ second scrambled code block in the N second scrambled code blocks is sent on the $i^{th}$ antenna port in the N antenna ports, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

In some embodiments of the present invention, the transceiver module 603 is specifically configured to: respectively send the N first scrambled code blocks on N time resource units in a first data transmission period by using the N antenna port groups, where an $i^{th}$ first scrambled code block in the N first scrambled code blocks is sent on the $i^{th}$ antenna port group in the N antenna port groups; and/or respectively send the N second scrambled code blocks on N time resource units in a second data transmission period by using the N antenna port groups, where an $i^{th}$ second scrambled code block in the N second scrambled code blocks is sent on the $i^{th}$ antenna port group in the N antenna port groups, and the second data transmission period is a data transmission period adjacent to the first data transmission period in time.

In some embodiments of the present invention, as shown in FIG. 6-d, the base station 600 further includes a third configuration module 606, configured to: add value information of N to the N broadcast channels; or use value information of N as masks of cyclical redundancy checks CRCs of the N broadcast channels.

Therefore, the base station indicates a quantity of broadcast channels to the UE by using the masks of the CRCs, and the UE can determine the quantity of broadcast channels by using the masks of the CRCs.

In some embodiments of the present invention, a quantity of bit positions in the SFN that are occupied by the second part information is determined based on a value of N.

In some embodiments of the present invention, a quantity of bit positions in the SFN that are occupied by the third part information is determined based on a quantity of scrambled code blocks sent to the UE corresponding to the $i^{th}$ broadcast channel.

It may be learned from the descriptions of the present invention in the foregoing embodiment, the base station determines the plurality of data blocks carried on the N broadcast channels, where the $i^{th}$ broadcast channel in the N broadcast channels corresponds to the $i^{th}$ antenna port in the N antenna ports, or the $i^{th}$ broadcast channel in the N broadcast channels corresponds to the $i^{th}$ antenna port group in the N antenna port groups; the base station scrambles the data blocks carried on the N broadcast channels, to obtain the scrambled code blocks carried on the N broadcast channels; and the base station sends, on the different time resource units by respectively using the N antenna ports, the corresponding scrambled code blocks carried on the broadcast channels, or the base station sends, on the different time resource units by respectively using the N antenna port groups, the corresponding scrambled code blocks carried on the broadcast channels. The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

Referring to FIG. 7-a, UE 700 provided in an embodiment of the present invention may include a transceiver module 701 and a descrambling module 702.

The transceiver module 701 is configured to: receive, on a time resource unit corresponding to the UE, a scrambled code block that is carried on an $i^{th}$ broadcast channel in N broadcast channels and that is sent by a base station by using an $i^{th}$ antenna port in N antenna ports, or receive, on a time resource unit corresponding to the UE, a scrambled code block that is carried on an $i^{th}$ broadcast channel in N broadcast channels and that is sent by the base station by using an $i^{th}$ antenna port group in N antenna port groups, where N is a positive integer, i is a positive integer greater than 0 and less than or equal to N, and the UE corresponds to the $i^{th}$ antenna port or the $i^{th}$ antenna port group.

The descrambling module 702 is configured to descramble the scrambled code block that is carried on the $i^{th}$ broadcast channel and that is received by using the $i^{th}$ antenna port or the $i^{th}$ antenna port group.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

In some embodiments of the present invention, the descrambling module 702 is specifically configured to: descramble the $i^{th}$ first scrambled code block carried on the $i^{th}$ broadcast channel; or descramble the $i^{th}$ second scrambled code block carried on the $i^{th}$ broadcast channel; or combine the $i^{th}$ first scrambled code block and the $i^{th}$ second scrambled code block that are carried on the $i^{th}$ broadcast channel, and then, descramble the $i^{th}$ first scrambled code block and the $i^{th}$ second scrambled code block that are combined.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

In some embodiments of the present invention, as shown in FIG. 7-b, the user equipment 700 further includes a first obtaining module 703, configured to: after the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain position information of the antenna port or the antenna port group of the UE based on indication information carried on the $i^{th}$ broadcast channel; or obtain position information of the antenna port or the antenna port group of the UE based on a pilot signal carried on the $i^{th}$ broadcast channel; or obtain position information of the antenna port of the UE based on a value of a synchronization sequence on the antenna port of the UE, or obtain position information of the antenna port group of the UE based on a value of a synchronization sequence on the antenna port group of the UE; or obtain position information of the antenna port or the antenna port group of the UE based on a scrambling code that is used when the scrambled code block carried on the $i^{th}$ broadcast channel is descrambled.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

In some embodiments of the present invention, as shown in FIG. 7-c, the user equipment 700 further includes a second obtaining module 704, configured to: before the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain first part information of a system frame number SFN by using system information on the $i^{th}$ broadcast channel in the N broadcast channels; and/or obtain second part information of the SFN by using a quantity of scrambled code blocks received by the UE; and/or obtain third part information of the SFN by using the position information of the antenna port or the antenna port group of the UE; and obtain the SFN by using the first part information and the second part information, or obtain the SFN by using the first part information and the third part information, or obtain the SFN by using the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

In some embodiments of the present invention, the transceiver module 701 is specifically configured to: receive, on an $i^{th}$ time resource unit in a first data transmission period, an $i^{th}$ first scrambled code block that is carried on the $i^{th}$ broadcast channel and that is sent by the base station by using the $i^{th}$ antenna port in the N antenna ports; and/or receive, on an $i^{th}$ time resource unit in a second data transmission period, an $i^{th}$ second scrambled code block that is carried on the $i^{th}$ broadcast channel and that is sent by the base station by using the $i^{th}$ antenna port in the N antenna ports, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

In some embodiments of the present invention, the transceiver module 701 is specifically configured to: receive, on an $i^{th}$ time resource unit in a first data transmission period, an $i^{th}$ first scrambled code block that is carried on the $i^{th}$ broadcast channel and that is sent by the base station by using the $i^{th}$ antenna port group in the N antenna port groups; and/or receive, on an $i^{th}$ time resource unit in a second data transmission period, an $i^{th}$ second scrambled code block that is carried on the $i^{th}$ broadcast channel and that is sent by the base station by using the $i^{th}$ antenna port group in the N antenna port groups, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

In some embodiments of the present invention, as shown in FIG. 7-d, the user equipment 700 further includes a third obtaining module 705, configured to: before the transceiver module receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtain a value of N from value information carried on the $i^{th}$ broadcast channel; or obtain a value of N based on a mask of a cyclical redundancy check CRC of the $i^{th}$ broadcast channel.

Therefore, the base station indicates a quantity of broadcast channels to the UE by using the masks of the CRCs, and the UE can determine the quantity of broadcast channels by using the masks of the CRCs.

In some embodiments of the present invention, a quantity of bit positions in the SFN that are occupied by the second part information is determined based on a value of N.

In some embodiments of the present invention, a quantity of bit positions in the SFN that are occupied by the third part information is determined based on a quantity of scrambled code blocks sent to the UE corresponding to the $i^{th}$ broadcast channel.

It may be learned from the descriptions of the present invention in the foregoing embodiment, the UE receives, on the time resource unit corresponding to the UE, the scrambled code block that is carried on the $i^{th}$ broadcast channel in the N broadcast channels and that is sent by the base station by using the $i^{th}$ antenna port in the N antenna ports, or receives, on the time resource unit corresponding to the UE, the scrambled code block that is carried on the $i^{th}$ broadcast channel in the N broadcast channels and that is sent by the base station by using the $i^{th}$ antenna port group in the N antenna port groups; and the UE descrambles the scrambled code block that is carried on the $i^{th}$ broadcast channel and that is received by using the $i^{th}$ antenna port or the $i^{th}$ antenna port group. The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

It should be noted that, content such as information exchange between the modules/units of the foregoing apparatus and an execution process belongs to a same idea as the method embodiments of the present invention; therefore, resulting technical effects are the same as those in the method embodiments of the present invention. For specific content, refer to the descriptions in the method embodiments of the present invention that is shown above, and details are not described herein again.

An embodiment of the present invention further provides a computer storage medium. The computer storage medium stores a program, and the program performs some or all of the steps recorded in the foregoing method embodiments.

Figure 8:
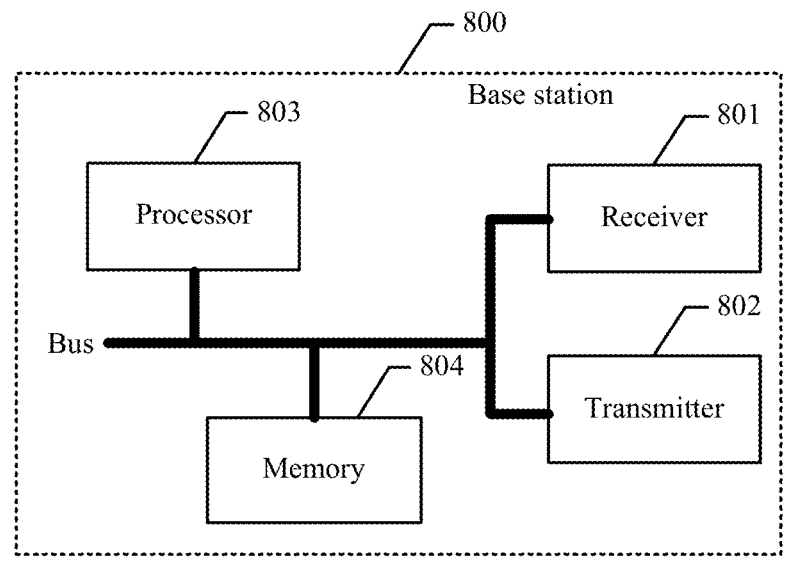
FIG. 8 is a schematic diagram of a composition structure of another base station according to an embodiment of the present invention.

Next, another base station provided in an embodiment of the present invention is described. Referring to FIG. 8, the base station 800 includes:

a receiver 801, a transmitter 802, a processor 803, and a memory 804 (there may be one or more processors 803 in the base station 800, and one processor is used as an example in FIG. 8). In some embodiments of the present invention, the receiver 801, the transmitter 802, the processor 803, and the memory 804 may be connected by using a bus or in another manner, and a connection by using a bus is used as an example in FIG. 8.

The processor 803 is configured to perform the following steps:

determining a plurality of data blocks carried on N broadcast channels, where an broadcast channel in the N broadcast channels corresponds to an $i^{th}$ antenna port in N antenna ports, or an $i^{th}$ broadcast channel in the N broadcast channels corresponds to an $i^{th}$ antenna port group in N antenna port groups, where N is a positive integer, and i is a positive integer greater than 0 and less than or equal to N;

scrambling the data blocks carried on the N broadcast channels, to obtain scrambled code blocks carried on the N broadcast channels; and sending, on different time resource units by respectively using the N antenna ports, corresponding scrambled code blocks carried on the broadcast channels, or sending, on different time resource units by respectively using the N antenna port groups, corresponding scrambled code blocks carried on the broadcast channels.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

In some embodiments of the present invention, the processor 803 is specifically configured to perform the following steps:

scrambling, by using a first scrambling code, a data block carried on each of the N broadcast channels, to obtain N first scrambled code blocks carried on the N broadcast channels;

and/or scrambling, by using a second scrambling code, a data block carried on each of the N broadcast channels, to obtain N second scrambled code blocks carried on the N broadcast channels, where the first scrambling code and the second scrambling code are different scrambling codes.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

In some embodiments of the present invention, the processor 803 is specifically configured to execute the following configuration content: the $i^{th}$ broadcast channel in the N broadcast channels carries indication information of an antenna port or an antenna port group of user equipment UE corresponding to the $i^{th}$ broadcast channel; or a pilot signal carried on the $i^{th}$ broadcast channel in the N broadcast channels corresponds to indication information of an antenna port or an antenna port group of UE corresponding to the $i^{th}$ broadcast channel; or a value of a synchronization sequence on an antenna port of UE corresponding to the $i^{th}$ broadcast channel in the N broadcast channels corresponds to indication information of the antenna port of the UE corresponding to the $i^{th}$ broadcast channel, or a value of a synchronization sequence on an antenna port group of UE corresponding to the $i^{th}$ broadcast channel in the N broadcast channels corresponds to indication information of the antenna port group of the UE corresponding to the $i^{th}$ broadcast channel; or a scrambling code that is used when a data block carried on the $i^{th}$ broadcast channel in the N broadcast channels is scrambled corresponds to indication information of an antenna port or an antenna port group of UE corresponding to the $i^{th}$ broadcast channel.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

In some embodiments of the present invention, the processor 803 is further configured to perform the following steps: after scrambling the data blocks carried on the N broadcast channels, to obtain the scrambled code blocks carried on the N broadcast channels, indicating, by using system information on the $i^{th}$ broadcast channel in the N broadcast channels, first part information of a system frame number SFN of the UE corresponding to the $i^{th}$ broadcast channel; and/or indicating second part information of the SFN by using a quantity of scrambled code blocks sent to the UE corresponding to the $i^{th}$ broadcast channel; and/or indicating third part information of the SFN by using position information of the antenna port or the antenna port group of the UE corresponding to the $i^{th}$ broadcast channel.

The SFN consists of the first part information and the second part information, or the SFN consists of the first part information and the third part information, or the SFN consists of the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

In some embodiments of the present invention, the processor 803 is specifically configured to perform the following steps:

respectively sending the N first scrambled code blocks on N time resource units in a first data transmission period by using the N antenna ports, where an $i^{th}$ first scrambled code block in the N first scrambled code blocks is sent on the $i^{th}$ antenna port in the N antenna ports; and/or respectively sending the N second scrambled code blocks on N time resource units in a second data transmission period by using the N antenna ports, where an $i^{th}$ second scrambled code block in the N second scrambled code blocks is sent on the $i^{th}$ antenna port in the N antenna ports, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

In some embodiments of the present invention, the processor 803 is specifically configured to perform the following steps:

respectively sending the N first scrambled code blocks on N time resource units in a first data transmission period by using the N antenna port groups, where an $i^{th}$ first scrambled code block in the N first scrambled code blocks is sent on the $i^{th}$ antenna port group in the N antenna port groups; and/or respectively sending the N second scrambled code blocks on N time resource units in a second data transmission period by using the N antenna port groups, where an $i^{th}$ second scrambled code block in the N second scrambled code blocks is sent on the $i^{th}$ antenna port group in the N antenna port groups, and the second data transmission period is a data transmission period adjacent to the first data transmission period in time.

Further, the base station transmits different scrambled data blocks in different data transmission periods, and the UE can receive the different scrambled data blocks in the corresponding data transmission periods, to descramble the received scrambled data blocks.

In some embodiments of the present invention, the processor 803 is specifically configured to execute the following configuration content: value information of N is added to the N broadcast channels; or value information of N is used as masks of cyclical redundancy checks CRCs of the N broadcast channels.

Therefore, the base station indicates a quantity of broadcast channels to the UE by using the masks of the CRCs, and the UE can determine the quantity of broadcast channels by using the masks of the CRCs.

In some embodiments of the present invention, the processor 803 is specifically configured to execute the following configuration content: a quantity of bit positions in the SFN that are occupied by the second part information is determined based on a value of N.

In some embodiments of the present invention, the processor 803 is specifically configured to execute the following configuration content: a quantity of bit positions in the SFN that are occupied by the third part information is determined based on a quantity of scrambled code blocks sent to the UE corresponding to the $i^{th}$ broadcast channel.

Figure 9:
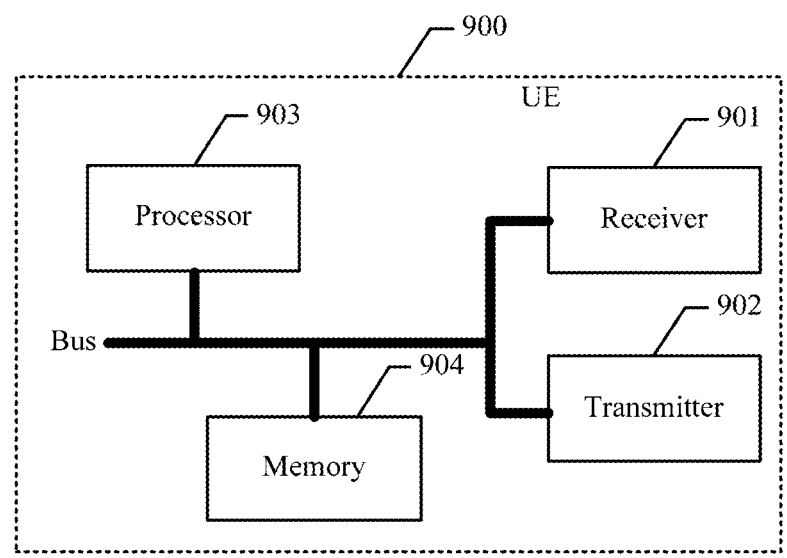
FIG. 9 is a schematic diagram of a composition structure of another UE according to an embodiment of the present invention.

Next, another UE provided in an embodiment of the present invention is described. Referring to FIG. 9, the UE 900 includes:

a receiver 901, a transmitter 902, a processor 903, and a memory 904 (there may be one or more processors 903 in the UE 900, and one processor is used as an example in FIG. 9). In some embodiments of the present invention, the receiver 901, the transmitter 902, the processor 903, and the memory 904 may be connected by using a bus or in another manner, and a connection by using a bus is used as an example in FIG. 9.

The processor 903 is configured to perform the following steps:

receiving, on a time resource unit corresponding to the UE, a scrambled code block that is carried on an $i^{th}$ broadcast channel in N broadcast channels and that is sent by a base station by using an $i^{th}$ antenna port in N antenna ports, or receiving, on a time resource unit corresponding to the UE, a scrambled code block that is carried on an $i^{th}$ broadcast channel in N broadcast channels and that is sent by the base station by using an $i^{th}$ antenna port group in N antenna port groups, where N is a positive integer, i is a positive integer greater than 0 and less than or equal to N, and the UE corresponds to the $i^{th}$ antenna port or the $i^{th}$ antenna port group; and descrambling the scrambled code block that is carried on the $i^{th}$ broadcast channel and that is received by using the $i^{th}$ antenna port or the $i^{th}$ antenna port group.

The base station separately scrambles the data blocks carried on the N broadcast channels, to obtain the scrambled code blocks carried on the N broadcast channels, and sends, on the different time resource units, the scrambled code blocks carried on the broadcast channels. To be specific, the base station sends, in a time division manner by using the N antenna ports or the N antenna port groups, the scrambled code blocks carried on the broadcast channels. UEs receive, by using antenna ports or antenna port groups corresponding to the UEs, the scrambled code blocks that are sent by the base station on the time resource units. In this way, the broadcast channels are transmitted on a plurality of antenna ports or antenna port groups, thereby expanding coverage of the broadcast channels.

In some embodiments of the present invention, the processor 903 is specifically configured to perform the following steps: descrambling the $i^{th}$ first scrambled code block carried on the $i^{th}$ broadcast channel; or descrambling the $i^{th}$ second scrambled code block carried on the $i^{th}$ broadcast channel; or combining the $i^{th}$ first scrambled code block and the $i^{th}$ second scrambled code block that are carried on the $i^{th}$ broadcast channel, and then, descrambling the $i^{th}$ first scrambled code block and the $i^{th}$ second scrambled code block that are combined.

The base station separately scrambles, by using two different types of scrambling codes, data blocks carried on all of the N broadcast channels, to obtain scrambled code blocks corresponding to the two types of scrambling codes. Therefore, the UE can descramble the data blocks by using different scrambling codes.

In some embodiments of the present invention, the processor 903 is further configured to perform the following steps:

before receiving, on the time resource unit corresponding to the UE, the scrambled code block that is carried on the $i^{th}$ broadcast channel in the N broadcast channels and that is sent by the base station by using the $i^{th}$ antenna port in the N antenna ports, or receiving, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtaining position information of the antenna port or the antenna port group of the UE based on indication information carried on the $i^{th}$ broadcast channel; or obtaining position information of the antenna port or the antenna port group of the UE based on a pilot signal carried on the $i^{th}$ broadcast channel; or obtaining position information of the antenna port of the UE based on a value of a synchronization sequence on the antenna port of the UE, or obtaining position information of the antenna port group of the UE based on a value of a synchronization sequence on the antenna port group of the UE; or obtaining position information of the antenna port or the antenna port group of the UE based on a scrambling code that is used when the scrambled code block carried on the $i^{th}$ broadcast channel is descrambled.

Therefore, the base station may determine the indication information of the antenna port or the antenna port group of the UE in a plurality of manners, for example, the broadcast channel carries the indication information, the pilot signal corresponds to the indication information, the synchronization sequence corresponds to the indication information, or the scrambling code corresponds to the indication information. The UE can obtain the position information of the antenna port or the antenna port group of the UE in these manners.

In some embodiments of the present invention, the processor 903 is specifically configured to perform the following steps:

before receiving, on the time resource unit corresponding to the UE, the scrambled code block that is carried on the $i^{th}$ broadcast channel in the N broadcast channels and that is sent by the base station by using the $i^{th}$ antenna port in the N antenna ports, or receiving, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtaining first part information of a system frame number SFN by using system information on the $i^{th}$ broadcast channel in the N broadcast channels; and/or obtaining second part information of the SFN by using a quantity of scrambled code blocks received by the UE; and/or obtaining third part information of the SFN by using the position information of the antenna port or the antenna port group of the UE; and obtaining the SFN by using the first part information and the second part information, or obtaining the SFN by using the first part information and the third part information, or obtaining the SFN by using the first part information, the second part information, and the third part information.

The base station may indicate the SFN to the UE in a plurality of manners, and the UE may determine composition of the SFN in a manner that is the same as that used by the base station, to determine the SFN by using two or three of the system information, the quantity of scrambled code blocks, and the position information of the antenna port or the antenna port group of the UE.

In some embodiments of the present invention, the processor 903 is specifically configured to perform the following steps:

receiving, on an $i^{th}$ time resource unit in a first data transmission period, an $i^{th}$ first scrambled code block that is carried on the $i^{th}$ broadcast channel and that is sent by the base station by using the $i^{th}$ antenna port in the N antenna ports; and/or receiving, on an $i^{th}$ time resource unit in a second data transmission period, an $i^{th}$ second scrambled code block that is carried on the $i^{th}$ broadcast channel and that is sent by the base station by using the $i^{th}$ antenna port in the N antenna ports, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

In some embodiments of the present invention, the processor 903 is specifically configured to perform the following steps:

receiving, on an $i^{th}$ time resource unit in a first data transmission period, an $i^{th}$ first scrambled code block that is carried on the $i^{th}$ broadcast channel and that is sent by the base station by using the $i^{th}$ antenna port group in the N antenna port groups; and/or receiving, on an $i^{th}$ time resource unit in a second data transmission period, an $i^{th}$ second scrambled code block that is carried on the $i^{th}$ broadcast channel and that is sent by the base station by using the $i^{th}$ antenna port group in the N antenna port groups, where the second data transmission period is a data transmission period adjacent to the first data transmission period.

Further, the base station transmits different scrambled data blocks in different data transmission periods, and the UE can receive the different scrambled data blocks in the corresponding data transmission periods, to descramble the received scrambled data blocks.

In some embodiments of the present invention, the processor 903 is specifically configured to perform the following steps:

before receiving, on the time resource unit corresponding to the UE, the scrambled code block that is carried on the $i^{th}$ broadcast channel in the N broadcast channels and that is sent by the base station by using the $i^{th}$ antenna port in the N antenna ports, or receiving, on the time resource unit corresponding to the UE, the scrambled code block that is carried on the $i^{th}$ broadcast channel in the N broadcast channels and that is sent by the base station by using the $i^{th}$ antenna port group in the N antenna port groups, obtaining a value of N from value information carried on the $i^{th}$ broadcast channel; or obtaining a value of N based on a mask of a cyclical redundancy check CRC of the $i^{th}$ broadcast channel.

Therefore, the base station indicates a quantity of broadcast channels to the UE by using the masks of the CRCs, and the UE can determine the quantity of broadcast channels by using the masks of the CRCs.

In some embodiments of the present invention, the processor 903 is specifically configured to perform the following step: determining a quantity of bit positions in the SFN that are occupied by the second part information based on a value of N.

In some embodiments of the present invention, the processor 903 is specifically configured to perform the following step: determining a quantity of bit positions in the SFN that are occupied by the third part information based on a quantity of scrambled code blocks sent to the UE corresponding to the broadcast channel.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
   determining, by a base station, a data block carried on an $i^{th}$ physical broadcast channel of N physical broadcast channels, wherein the $i^{th}$ physical broadcast channel corresponds to an $i^{th}$ beam of N beams, wherein N is a positive integer greater than 1, and i is a positive integer greater than 0 and less than or equal to N;
   scrambling, by the base station, the data block carried on the $i^{th}$ physical broadcast channel, to obtain a scrambled code block carried on the $i^{th}$ physical broadcast channel; and
   sending, by the base station on a first time resource unit by using the $i^{th}$ beam, the corresponding scrambled code block carried on the $i^{th}$ physical broadcast channel, wherein the first time resource unit is one of time resource units corresponding to the N beams; and, wherein the $i^{th}$ physical broadcast channel satisfies at least one of the following:
   the $i^{th}$ physical broadcast channel carries indication information of a beam corresponding to the $i^{th}$ physical broadcast channel;
   a pilot signal carried on the $i^{th}$ physical broadcast channel corresponds to indication information of a beam corresponding to the $i^{th}$ physical broadcast channel, wherein pilot signals carried on the N physical broadcast channels are different from each other; and
   a scrambling code for scrambling the data block carried on the $i^{th}$ physical broadcast channel corresponds to indication information of a beam corresponding to the $i^{th}$ physical broadcast channel.

2. The method according to claim 1, wherein the method further comprises:
   indicating, by the base station by using system information on the $i^{th}$ physical broadcast channel, first part information of a system frame number (SFN) corresponding to the $i^{th}$ physical broadcast channel; and/or
   indicating, by the base station, second part information of the SFN by using a scrambled code corresponding to the $i^{th}$ physical broadcast channel; wherein
   the SFN includes the first part information and the second part information.

3. The method according to claim 1, wherein the first part information of the SFN includes the most significant bit of the SFN and the second part information of the SFN consists of two bits in the SFN, where neither of the two bits is the least significant bit nor the most significant bit.

4. The method according to claim 1, further comprising:
   carrying, by the base station, value information of N on the $i^{th}$ physical broadcast channel.

5. A data transmission method, comprising:
   receiving, by user equipment (UE) on a first time resource unit, a scrambled code block that is carried on an $i^{th}$ physical broadcast channel of N physical broadcast channels, wherein the $i^{th}$ physical broadcast channel corresponds to an $i^{th}$ beam of N beams, N is a positive integer greater than 1, i is a positive integer greater than 0 and less than or equal to N, and the first time resource unit is one of time resource units corresponding to the N beams; and
   descrambling, by the UE, the scrambled code block that is carried on the $i^{th}$ physical broadcast channel;
   wherein the $i^{th}$ physical broadcast channel satisfies at least one of the following:
   the $i^{th}$ physical broadcast channel carries indication information of a beam corresponding to the $i^{th}$ physical broadcast channel;
   a pilot signal carried on the $i^{th}$ physical broadcast channel corresponds to indication information of a beam corresponding to the $i^{th}$ physical broadcast channel, wherein pilot signals carried on the N physical broadcast channels are different from each other; and
   a scrambling code for scrambling the data block carried on the $i^{th}$ physical broadcast channel corresponds to indication information of a beam corresponding to the $i^{th}$ physical broadcast channel.

6. The method according to claim 5, wherein the method further comprises:
   obtaining, by the UE, a system frame number (SFN) of a system frame where the $i^{th}$ physical broadcast channel is located, wherein first part information of the system frame number (SFN) is carried in system information on the $i^{th}$ physical broadcast channel, and a second part information of the SFN is indicated by a scrambled code for descrambling the scrambled code block that is carried on the $i^{th}$ physical broadcast channel.

7. The method according to claim 5, further comprising:
   obtaining, by the UE, a value of N from value information carried on the $i^{th}$ physical broadcast channel.

8. The method according to claim 6, wherein The base station according to claim 7, wherein the first part information of the SFN includes the most significant bit of the SFN and the second part information of the SFN consists of two bits in the SFN, where neither of the two bits is the least significant bit nor the most significant bit.

9. An apparatus, comprising:
   a processor, configured to determine a data block carried on an $i^{th}$ physical broadcast channel of N physical broadcast channels, wherein the $i^{th}$ physical broadcast channel corresponds to an $i^{th}$ beam of N beams wherein N is a positive integer greater than 1, and i is a positive integer greater than 0 and less than or equal to N; and
   to scramble the data block carried on the $i^{th}$ physical broadcast channel, to obtain a scrambled code block carried on the $i^{th}$ physical broadcast channel; and
   a transceiver, configured to: send, on a first time resource unit by using the $i^{th}$ beam, the corresponding scrambled code block carried on the $i^{th}$ physical broadcast channel, wherein the first time resource unit is one of time resource units corresponding to the N beams; and, wherein the $i^{th}$ physical broadcast channel satisfies at least one of the following:

wherein the i$^{th}$ physical broadcast channel carries indication information of a beam corresponding to the i$^{th}$ physical broadcast channel;

a pilot signal carried on the i$^{th}$ physical broadcast channel corresponds to indication information of a beam corresponding to the i$^{th}$ physical broadcast channel, wherein pilot signals carried on the N physical broadcast channels are different from each other; and a scrambling code for scrambling the data block carried on the i$^{th}$ physical broadcast channel corresponds to indication information of a beam corresponding to the i$^{th}$ physical broadcast channel.

10. The apparatus according to claim 9, wherein the processor is further configured to indicate first part information of a system frame number (SFN) corresponding to the i$^{th}$ physical broadcast channel by using system information on the i$^{th}$ physical broadcast channel; and/or indicate second part information of the SFN by using a scrambled code corresponding to the i$^{th}$ physical broadcast channel, wherein the SFN includes the first part information and the second part information.

11. The apparatus according to claim 10, wherein the first part information of the SFN includes the most significant bit of the SFN and the second part information of the SFN consists of two bits in the SFN, where neither of the two bits is the least significant bit nor the most significant bit.

12. The apparatus according to claim 9, wherein the processor is further configured to carry value information of N on the i$^{th}$ physical broadcast channel.

13. The apparatus according to claim 9, wherein the apparatus is a base station.

14. An apparatus, comprising:

a transceiver, configured to: receive, on a first time resource unit, a scrambled code block that is carried on an i$^{th}$ physical broadcast channel of N physical broadcast channels, wherein the ith physical broadcast channel corresponds to an i$^{th}$ beam of N beams, N is a positive integer greater than 1, i is a positive integer greater than 0 and less than or equal to N, and the first time resource unit is one of time resource units corresponding to the N beams; and a processor, configured to descramble the scrambled code block that is carried on the i$^{th}$ physical broadcast channel;

wherein the i$^{th}$ physical broadcast channel satisfies at least one of the following:

the i$^{th}$ physical broadcast channel carries indication information of a beam corresponding to the i$^{th}$ physical broadcast channel;

a pilot signal carried on the i$^{th}$ physical broadcast channel corresponds to indication information of a beam corresponding to the i$^{th}$ physical broadcast channel, wherein pilot signals carried on the N physical broadcast channels are different from each other; and a scrambling code for scrambling the data block carried on the i$^{th}$ physical broadcast channel corresponds to indication information of a beam corresponding to the i$^{th}$ physical broadcast channel.

15. The apparatus according to claim 14, wherein the processor is further configured to: obtain a system frame number (SFN) of a system frame where the i$^{th}$ physical broadcast channel is located, wherein first part information of the system frame number (SFN) is carried in system information on the i$^{th}$ physical broadcast channel, and a second part information of the SFN is indicated by a scrambled code for descrambling the scrambled code block that is carried on the i$^{th}$ physical broadcast channel.

16. The apparatus according to claim 15, wherein the first part information of the SFN includes the most significant bit of the SFN and the second part information of the SFN consists of two bits in the SFN, where neither of the two bits is the least significant bit nor the most significant bit.

17. The apparatus according to claim 14, wherein the processor is further configured to obtain a value of N from value information carried on the i$^{th}$ physical broadcast channel.

18. The apparatus according to claim 14, wherein the apparatus is a user equipment (UE).

* * * * *